US009643371B2

(12) United States Patent
Reinlein et al.

(10) Patent No.: US 9,643,371 B2
(45) Date of Patent: May 9, 2017

(54) METHOD FOR ROLL-BENDING A PROFILE, PROFILE, METHOD FOR MANUFACTURING BENT PROFILE WORKPIECES, BENT PROFILE WORKPIECE, DEVICE FOR ROLL-BENDING A PROFILE, AND EXTRUSION AND ROLL-BENDING LINE

(71) Applicant: Kunststoff-Technik Scherer & Trier GmbH & Co. KG, Michelau (DE)

(72) Inventors: Peter Reinlein, Michelau (DE); Bernd Butz, Altenkunstadt (DE)

(73) Assignee: Samvardhana Motherson Innovative Autosystems B.V. & KG, Bruchkobel (DE)

( * ) Notice: Subject to any disclaimer, the term of this patent is extended or adjusted under 35 U.S.C. 154(b) by 390 days.

(21) Appl. No.: 13/894,464

(22) Filed: May 15, 2013

(65) Prior Publication Data
US 2013/0319602 A1 Dec. 5, 2013

(30) Foreign Application Priority Data

May 31, 2012 (DE) .................. 10 2012 209 160

(51) Int. Cl.
*B29D 23/00* (2006.01)
*B29C 47/00* (2006.01)
(Continued)

(52) U.S. Cl.
CPC ............ *B29D 23/00* (2013.01); *B29C 47/003* (2013.01); *B29C 47/0019* (2013.01);
(Continued)

(58) Field of Classification Search
CPC ......... B29C 53/02; B29C 53/38; B29C 53/48; B29C 53/50; B29C 53/52; B29C 53/54;
(Continued)

(56) References Cited

U.S. PATENT DOCUMENTS 2,914,170 A * 11/1959 Kent .............................. 72/19.7
3,485,076 A * 12/1969 Colburn ................... B21D 5/08
72/179
(Continued)

FOREIGN PATENT DOCUMENTS

CH 488546 A 9/1969
DE 10229081 A1 1/2004
(Continued)

OTHER PUBLICATIONS

European Search Report in corresponding Eurorpean Application, EP 13167974.8, dated Nov. 20, 2013.
(Continued)

*Primary Examiner* — Jeffrey Wollschlager
(74) *Attorney, Agent, or Firm* — Manelli Selter PLLC; Edward J. Stemberger

(57) ABSTRACT

The invention relates to a method for roll-bending a profile which comprises at least one cross-sectional region which is formed from a plastics material which is shaped by extrusion. A first and a second bending roller set are provided, each including bending rollers which are arranged in such a way that a passage, which enables guiding of the profile, is formed between the bending rollers of each of the bending roller sets. The profile is bent about a first bending axis and about a second bending axis which is non-parallel thereto, the translations and rotations of the second bending roller set being brought about simultaneously at least at times and/or mutually offset in time in a predetermined sequence.

19 Claims, 8 Drawing Sheets

(51) Int. Cl.

| | | |
|---|---|---|
| *B29C 53/08* | (2006.01) | |
| *B29C 53/38* | (2006.01) | |
| B29C 53/52 | (2006.01) | |
| B29C 53/02 | (2006.01) | |
| B29C 53/48 | (2006.01) | |
| B29C 53/50 | (2006.01) | |
| B21D 7/04 | (2006.01) | |
| B29C 53/54 | (2006.01) | |
| B21D 7/08 | (2006.01) | |
| B21D 7/00 | (2006.01) | |
| B29C 47/02 | (2006.01) | |
| B29C 47/10 | (2006.01) | |
| B29C 47/88 | (2006.01) | |

(52) U.S. Cl.
CPC ...... *B29C 47/0023* (2013.01); *B29C 47/0035* (2013.01); *B29C 47/0059* (2013.01); *B29C 53/083* (2013.01); *B21D 7/00* (2013.01); *B21D 7/04* (2013.01); *B21D 7/08* (2013.01); *B29C 47/025* (2013.01); *B29C 47/1036* (2013.01); *B29C 47/884* (2013.01); *B29C 53/02* (2013.01); *B29C 53/38* (2013.01); *B29C 53/48* (2013.01); *B29C 53/50* (2013.01); *B29C 53/52* (2013.01); *B29C 53/54* (2013.01); *Y10T 156/1007* (2015.01)

(58) Field of Classification Search
CPC ........ B29C 47/0059; B21D 7/00; B21D 7/08; B21D 7/04
See application file for complete search history.

(56) References Cited

U.S. PATENT DOCUMENTS

| | | | | | |
|---|---|---|---|---|---|
| 4,080,815 | A | * | 3/1978 | Foster | B21D 5/08 72/168 |
| 4,094,056 | A | * | 6/1978 | Takeda | B29C 53/04 29/527.2 |
| 4,367,641 | A | * | 1/1983 | Mizutani | B21D 11/14 72/166 |
| 4,391,116 | A | * | 7/1983 | Yogo | B21D 7/08 72/166 |
| 4,394,412 | A | * | 7/1983 | Yamamoto | E04D 13/064 428/174 |
| 4,624,121 | A | * | 11/1986 | Kitsukawa | B21D 7/08 72/168 |
| 5,390,538 | A | * | 2/1995 | Spath | B21D 9/10 72/133 |
| 5,425,257 | A | * | 6/1995 | Kitsukawa et al. | 72/12.3 |
| 6,007,319 | A | * | 12/1999 | Jacobson | B29C 47/0021 425/140 |
| 8,650,922 | B2 | * | 2/2014 | Hayashi | B21D 11/06 72/149 |
| 2004/0245665 | A1 | * | 12/2004 | Yamaguchi | B29C 47/884 264/40.1 |
| 2005/0199033 | A1 | * | 9/2005 | Spaeth | B21D 9/10 72/389.1 |
| 2008/0257004 | A1 | * | 10/2008 | Spaeth | B21D 7/08 72/167 |
| 2010/0116012 | A1 | * | 5/2010 | Hermes | B21D 7/08 72/166 |
| 2010/0147446 | A1 | * | 6/2010 | Ciolczyk | F16L 9/133 156/191 |
| 2010/0218577 | A1 | * | 9/2010 | Tomizawa | B21D 7/08 72/128 |
| 2011/0048585 | A1 | * | 3/2011 | Toki et al. | 148/529 |

FOREIGN PATENT DOCUMENTS

| | | |
|---|---|---|
| DE | 69922761 T2 | 12/2004 |
| DE | 102004002539 A1 | 8/2005 |
| EP | 0151534 A2 | 8/1985 |
| EP | 0405600 A1 | 2/1991 |
| WO | 2012026836 A1 | 3/2012 |

OTHER PUBLICATIONS

Office Action in co-pending DE 102012219639.0, dated Jul. 4, 2013.

* cited by examiner

METHOD FOR ROLL-BENDING A PROFILE, PROFILE, METHOD FOR MANUFACTURING BENT PROFILE WORKPIECES, BENT PROFILE WORKPIECE, DEVICE FOR ROLL-BENDING A PROFILE, AND EXTRUSION AND ROLL-BENDING LINE

CROSS REFERENCE TO RELATED APPLICATION

This application claims the benefit of German patent application No. 10 2012 209 160.2, filed May 31, 2012 the entire disclosure of which is herein incorporated by reference.

FIELD OF THE INVENTION

The present invention relates to a method for roll-bending a profile, to a profile which is roll-bent by a method of this type, to a method for producing roll-bent profile workpieces, and to a bent profile workpiece which is produced by a method of this type. The invention further relates to a device for roll-bending a profile and to an extrusion and roll-bending line for producing bent profile workpieces, which comprises a device of this type.

BACKGROUND OF THE INVENTION

DE 10 2004 002 539 A1 discloses a bending method and a bending device for bending elongate profile bodies, in particular for bending pipes. In this context, an initially straight pipe is transported by means of a drive unit comprising rollers which are driven in opposite directions. This pipe is bent by means of a pair of driven bending rollers and a bending roller which is adjustable in a direction of advance and perpendicular thereto, and which can also be rotated about an axis which extends substantially parallel to the axis of advance. So as to make three-dimensional bending of the pipe possible, a rotation unit is provided, by means of which the pipe can be rotated about the axis thereof during the advance.

However, the use of a conventional method of this type and a conventional device of this type may be found to be unfavourable if the profile which is to be bent in three dimensions in space is to be produced by a continuous method, for example by extrusion, in a production step upstream from the bending. Rotation of the profile about the axis of advance thereof, as provided in accordance with the conventional method for three-dimensional bending, requires a portion which is to be bent of the profile to be separated in advance from the continuous strand. Further, the conventional bending method and the conventional bending device are disadvantageous for irregular, non-circular profile cross-sections—for example for rail-shaped or channel-shaped profiles—because of the aforementioned requirement to rotate the profile, among other reasons.

Further, the use of driven drive and bending rollers, such as are provided in the conventional device, can lead to visible traces being left behind, during the bending process, on an outer surface of the profile which comes into contact with the rollers. If the outer surface of the profile will subsequently be a visible surface, at least in regions, reductions of this type in the surface quality are undesirable for aesthetic reasons.

This is a situation which would merit improvement.

SUMMARY OF THE INVENTION

Against this background, an aspect of the present invention is to propose improved methods for bending profiles and producing bent profile workpieces, which overcome the aforementioned drawbacks and make possible economical manufacture, saving labour and material, of bent profiles. A further aim is to bend even non-circular profiles in a dimensionally accurate manner, whilst the cross-sectional geometry thereof should also be detracted from as little as possible by the bending process, as a result of pinching or the like. Further, a bending device and a production line for bent profile workpieces which are both improved to this effect are to be provided.

According to the invention, this aspect is achieved by a method for roll-bending a profile and/or by a method for producing bent profile workpieces and/or by a device for roll-bending a profile and/or by an extrusion and roll-bending line for producing bent profile workpieces.

Accordingly, a method is provided for roll-bending a profile which comprises at least one cross-sectional region which is formed from a plastics material which is shaped by extrusion, comprising the following steps:

- a first bending roller set and a second bending roller set are provided. In this context, the first and second bending roller sets each comprise bending rollers which are arranged in such a way that a passage, which enables guiding the profile, is formed between the bending rollers of each of the bending roller sets;
- the profile is inserted into the first bending roller set;
- during the insertion of the profile, the profile is guided through the first bending roller set and the second bending roller set; and
- during the insertion and guidance of the profile, the second bending roller set is displaced relative to the first bending roller set in such a way that the second bending roller set is translated in at least a first spatial direction and a second spatial direction which is non-parallel to the first spatial direction, and rotated about at least a first axis of rotation and a second axis of rotation which is non-parallel to the first axis of rotation. As a result, the profile is bent about a first bending axis and about a second bending axis which is non-parallel to the first bending axis, the translations and rotations of the second bending roller set being brought about simultaneously at least at times and/or mutually offset in time in a predetermined sequence.

This means that the translations of the second bending roller set in the two spatial directions and rotations thereof about the two axes of rotation are each brought about during a period and in a temporal sequence which are necessary and appropriate for giving the profile a desired, spatially bent shape and simultaneously guiding the profile as gently as possible. In particular, in this context the speed at which the second bending roller set is moved in translation and the angular velocity at which the second bending roller set is moved in rotation can be selected, and if necessary varied over time, while taking into account the desired bending shape and the speed at which the profile is inserted.

According to the invention, a profile is additionally proposed which comprises at least one cross-sectional region formed of a plastics material shaped by extrusion and which has been roll-bent by a method of this type for roll-bending a profile.

Further, according to the invention a method for producing bent profile workpieces by means of an extrusion and roll-bending line is provided. In this method, a profile is formed as a continuous strand from a plastics material shaped by extrusion, by means of an extrusion tool, in at least one cross-sectional region. Subsequent to the extrusion process, portions of the profile which are in succession in the extrusion and roll-bending line are subjected to roll-bending to form the bent profile workpieces by the above-disclosed method according to the invention for roll-bending a profile.

According to the invention, a bent profile workpiece is further provided which comprises at least one cross-sectional region formed from a plastics material shaped by extrusion and which is produced by a method of this type for producing bent profile workpieces.

The invention further proposes a device for roll-bending a profile which comprises at least one cross-sectional region formed from a plastics material shaped by extrusion, comprising a first bending roller set, a second bending roller set, a frame and a bending head. The first and second bending roller sets each comprise bending rollers which are arranged in such a way that a passage, which enables guiding the profile, is formed between the bending rollers of each of the bending roller sets. The bending rollers of the first bending roller set are mounted on the frame. The bending head carries the second bending roller set and is movable with respect to the frame. In this context, the bending head is coupled to the frame in such a way that the bending head, for bending the profile about a first bending axis, can be rotated about a first axis of rotation and translated in at least a first spatial direction with respect to the frame. Further, the second bending roller set is coupled to the bending head in such a way that the second bending roller set, for bending the profile about a second bending axis which is non-parallel to the first bending axis, can be rotated about a second axis of rotation and translated in at least a second spatial direction with respect to the bending head. In this context, the first and second spatial directions are orientated non-parallel to one another, and the first and second axes of rotation are likewise orientated non-parallel to one another.

The invention further provides an extrusion and roll-bending line for producing bent profile workpieces, which comprises an extrusion tool and a device of this type for roll-bending. The extrusion tool is set up so as to form a profile as a continuous strand from a plastics material shaped by extrusion, in at least one cross-sectional region. The device for roll-bending the profile is arranged on the output side of the extrusion tool and is provided so as to subject portions of the profile which are in succession to roll-bending so as to form the bent profile workpieces, subsequent to the extrusion process.

The idea behind the invention is that by way of the aforementioned translation and rotation of the second bending roller set with respect to the first bending roller set, the profile can be prevented, during the three-dimensional bending, from rotating about the advance direction thereof before it arrives between the rollers which carry out the actual bending. In the present invention, the roll-bending can be carried out as what is known as 3D inline roll-bending, that is to say the bending procedure can advantageously take place together with the extrusion of a profile strand, without previous cutting to length, as a continuous process within one and the same production line. Alternatively, however, straight profile strand pieces which are to be bent, which have already been cut to length, and for which rotation about the advance direction is undesirable or to be prevented for other reasons, can also be roll-bent by the method according to the invention for roll-bending and by means of the device according to the invention. Further, because it is possible to dispense with the rotation of the profile about the advance direction, which is necessary in conventional methods, the invention makes possible greatly improved bending of profiles of non-circular cross-sections, for which this rotation is unfavourable or impossible to carry out.

The fact that the second bending roller set can be moved is also beneficial to the surface quality of the bent profile. For example, the second bending roller set can be translated in the first of the two non-parallel spatial directions and rotated about the first of the two axes of rotation, so as to bend the profile about the first bending axis, which may be a principal bending axis of the profile. By rotating about the first axis of rotation and translating in the first spatial direction, the bending rollers of the second bending roller set can be orientated in such a way that, during the bending, the profile always passes through the passage formed between the bending rollers, through which it should be possible to guide the profile, in the optimum orientation. Jamming, friction and slip between outer surface of the profile and surfaces of the bending rollers of the second bending roller set are thus prevented, and visible surfaces of the profile are not pinched or scratched.

In a corresponding manner, the second bending roller set can be translated in the second of the two spatial directions and rotated about the second of the two axes of rotation with respect to the first bending roller set so as to bend the profile about the second bending axis, which may be a subsidiary bending axis of the profile. In the same manner described above for bending about the first bending axis, by translating in the second spatial direction and rotating about the second axis rotation it can be provided that the profile always enters the passage formed between the bending spaces of the second bending roller set in the optimum orientation.

In this way, the invention advantageously prevents the surface of the profile from being scratched or defaced during the bending. This can be particularly useful for profiles which are formed at least in regions with a visible surface of a plastics material, so as to achieve a defect-free product.

When the profile cross-section is changed, with the invention it is sufficient merely to replace the first and second bending roller sets, the passages of which guide the profile and thus make reliable and dimensionally accurate bending possible, with two bending roller sets having different passages. With the invention, a change in the bending shape does not require a change of tool, but merely a change in the sequence of rotations and translations of the second bending roller set. If the rotations and translations are carried out for example with program control by means of a computer, it is sufficient to change the control program accordingly when the bending shape changes. By comparison with methods which necessitate a specially manufactured tool (core) for each bending shape, such as stretch bending, for example, the invention greatly improves the flexibility and reduces the costs and labour.

The profiles and bent profile workpieces proposed according to the invention can be bent in an efficient manner, which is gentle to the material, in that the longitudinal extent thereof follows a complicated spatial trajectory, which can be selected freely. Highly advantageously, they have a high-quality, undamaged outer surface, with no visible manufacturing traces, marks or other damage.

Advantageous embodiments and developments may be taken from the further dependent claims and from the description with reference to the drawings.

In a development of the method for roll-bending according to the invention, the first and second spatial directions are each orientated at an inclination to an insertion direction in which the profile is inserted. Preferably, the two spatial directions each extend substantially perpendicular to the insertion direction. This makes it possible to bend the profile about two bending axes which are at an inclination to the insertion direction, in particular substantially perpendicular thereto.

In a further embodiment of the method for roll-bending, the first and second spatial directions are orientated substantially mutually perpendicular. In this way, bending about two substantially mutually perpendicular first and second bending axes is made possible.

In an advantageous development of the method for roll-bending, the first axis of rotation extends substantially perpendicular to the first spatial direction, the rotation about the first axis of rotation being simultaneous with the translation in the first spatial direction, for the bending about the first bending axis. Thus, at any moment during the translation in the first spatial direction, the passage formed between the bending rollers of the first bending roller set can be orientated in such a way that the profile enters the passage in an optimum manner even when said passage is displaced in translation in the first spatial direction with respect to the displacement direction, and thus is not scratched, and the rollers roll off while sliding as little as possible on the profile.

In one embodiment of the method for roll-bending, the profile is guided through the bending rollers of the bending roller set on all sides, as seen in a cross-section of the profile. Guidance of this type, which is particularly reliable, makes it possible to bend the shape freely in any spatial direction.

In a further embodiment of the method for roll-bending, the second bending roller set is formed with at least one pair of bending rollers, the bending rollers of the pair having roller axes of rotation which extend mutually parallel. As a result, it is possible in particular to guide the profile reliably from two opposite sides during the bending.

In a development of the method for roll-bending, the second bending roller set is formed with two pairs of bending rollers, the roller axes of rotation of the bending rollers of each pair extending mutually parallel. In this way, the profile can be guided in such a way that the position thereof, in a plane normal to a trajectory followed by the bent profile, is fixed in a manner defined by the bending rollers rolling off on the surface thereof.

In a further embodiment of the method for roll-bending, the roller axes of rotation of the bending rollers of the second bending roller set are positioned in a plane. As a result, the profile can be guided by way of surface contact along contact lines, positioned in this plane, with the bending rollers. In this way, the bending rollers of the second bending roller set can be translated together and rotated about the first and second axes of rotation about a shared centre, without the profile jamming in the passage or the radii of bending which can be achieved being unnecessarily restricted.

In an advantageous embodiment of the method for roll bending, the second axis of rotation always extends parallel to the roller axes of rotation of one of the pairs of bending rollers of the second bending roller set. In this context, during rotation of the second bending roller set about the second axis of rotation, the bending rollers of this pair can roll off on the profile.

In a further advantageous improvement of the method for roll-bending, for the bending about the second bending axis, the rotation about the second axis of rotation is simultaneous with the translation in the second spatial direction. This improvement means that the passage of the second bending roller set can always be orientated in an optimum manner with respect to the entering profile even during bending about the second bending axis.

Preferably, the rotation about the first axis of rotation, carried out simultaneously with the translation in the first spatial direction, and the rotation about the second axis of rotation, carried out simultaneously with the translation in the second spatial direction, take place in such a way that, coming from the first bending roller set, the profile always enters the passage of the second bending roller set substantially perpendicular to the plane in which the roller axes of rotation of the bending rollers of the second bending roller set are positioned.

In one embodiment of the method for roll bending, the movement of the second bending roller set comprises an additional rotation of the second bending roller set with respect to the first bending roller set about a third axis of rotation, simultaneous at least at times to its rotations and translations and/or mutually offset in time in a predetermined sequence with respect to the movement of the second bending roller set. In this context, the third axis of rotation extends substantially tangential to a trajectory of the profile, in a region of the profile which is received in the passage of the second bending roller set. As a result, in this embodiment the profile is provided with a twist, at least in regions, in addition to the bending about the first bending axis and about the second bending axis. As a result of this embodiment, the configuration possibilities as regards the three-dimensional shape of the bent profile are expanded further.

In a further embodiment of the method for roll bending, the bending rollers of the first bending roller set are each set in rotation exclusively by the movement of the profile during the insertion thereof. Further, the bending rollers of the second bending roller set are each set in rotation exclusively by the movement of the profile during the insertion thereof and by the rotations of the second bending roller set about the first and second axes of rotation. In this context, the bending rollers roll off on the profile. "Exclusively" means that the rotation of the bending rollers about the respective roller axes of rotation is brought about substantially by static friction, purely by way of surface contact of the respective bending rollers with the profile during the insertion thereof. However, additional angular speeds can be superposed on the rotation of the second bending roller set about the first and second axes of rotation, by displacing the roller axes of rotation of the bending rollers in the space of the respective rotation of the bending rollers of the second bending roller set about the roller axes of rotation thereof. This process is still to be included by the term "exclusively". In other words, the bending rollers of the first and second bending roller set are not driven so as to transport the profile. Instead, the rotation of each of the bending rollers about the roller axis of rotations thereof can be set freely in accordance with the advance of the profile and the movement of the second bending roller set. The surface of the profile which is to be bent is thus handled gently, and this is particularly advantageous if the profile comprises visible surfaces.

In a further embodiment of the method for roll bending, the insertion of the profile is brought about by means of a discharge conveyor arrangement. An arrangement of this type (also known as a discharger) can advantageously be configured in such a way that the profile is driven, so as to transport and insert it, via a comparatively large surface region of the profile. In particular, a frictional force, which is applied to the surface of the profile and serves to transport the profile, can be distributed over a relatively large area. Likewise, in this way, the surface of the profile is advantageously handled gently.

In a development of the method for roll bending, the discharge conveyor arrangement comprises two belts or track rollers, extending mutually parallel in portions and preferably endless, each comprising a flexible surface which faces the profile. In accordance with this development, the profile which is to be bent is transported between the belts or track rollers by way of surface contact with the belts or track rollers so as to insert it. Belts and/or track rollers with a flexible surface of this type may additionally contribute to the prevention of damage to the surface of the profile.

In a further development of the method for roll bending, before being inserted into the first bending roller set, the profile initially passes through an entry guide comprising one or more sets of guide rollers for guiding the profile and for preventing the profile from buckling. In this context, the profile is inserted into the entry guide and enters the passage of the first bending roller set at the output end of the entry guide. Further, in this context, the guide rollers are set in rotation about the respective roller axes of rotation thereof exclusively by the movement of the profile during the insertion thereof. By means of an entry guide of this type, the profile—to which, for insertion, a force is applied in the longitudinal direction thereof, representing the preferred feed direction—can advantageously be prevented from buckling under this force. Furthermore, favourably, as a result of the additional guidance of the profile by means of the entry guide, the profile further enters the passage of the first bending roller set in a precisely defined orientation. Guide rollers which are set in rotation purely as a result of the insertion process, and which, like the bending rollers, are not driven so as to transport the profile, again contribute to the gentle handling of the profile surface.

In one embodiment of the method according to the invention for producing bent profile workpieces, at least one reinforcement consisting of a metal material, in particular a steel, is embedded in the plastics material at least in part during the extrusion process inside the extrusion tool. In this way it is possible in a particularly economical manner, within just one unitary production line, to produce a high-quality profile workpiece which is produced by extruding a plastics material, is reinforced by a metal reinforcement or inlay, and can be bent into shape freely in three dimensions In a further embodiment of the method for producing bent profile workpieces, after passing through the first bending roller set and the second bending roller set, each of the portions of the profile is cut off from the continuous strand so as to form one of the bent profile workpieces, by means of a cutting means which can be moved in space on the output side of the second bending roller set. In particular, the cutting means may be positioned by moving it in space, and the cutting means may be activated to cut through the strand, as a function of a measured advance length of the profile strand. For example, this advance length can be measured in the region of the entry guide. The bent profile workpieces can thus be cut off from the continuous strand in an automated manner with program control, and the fact that the cutting means can be moved in space makes it possible to displace the cutting means to precisely the point in space where the profile workpiece, exiting the second bending roller set along the curved trajectory thereof and moving during the bending process, is to be cut off.

In a further advantageous development of the method for producing bent profile workpieces, after exiting the second bending roller set, the portion of the profile is gripped on the output side thereof by means of a handling means, before or while the portion is cut off from the continuous strand. In this context, the handling means is tracked to a spatial movement of the portion brought about by the roll bending, and after being cut off from the continuous strand, the produced bent profile workpiece is transported onwards and/or set down, for further processing or storage, by means of the handling means. In this way, on the one hand gripping before cutting off can prevent profile workpieces which are already bent from deforming under their own weight, when they have not yet been cut off from the continuous strand and are protruding from the second bending roller set, and thus reducing the precision of the produced bent shape of the profile. The handling means can accordingly be provided so as already to be gripping and supporting the portion of the profile when it has not yet fully exited the second bending roller set. On the other hand, in this development the profile workpiece is also prevented from falling down when being cutting off. It is possible to avoid a worker having to hold and set down the bent profile workpiece by hand, and this is beneficial both to the work safety and to the dimensional accuracy of the produced profile.

In one embodiment of the device according to the invention for roll bending a profile, the first and second spatial directions are each orientated at an inclination to an insertion direction in which the profile can be inserted into the first bending roller set, preferably each substantially perpendicular thereto. As a result, bending is made possible about first and second bending axes which are orientated at an inclination to the insertion direction, preferably substantially perpendicular thereto.

In a further embodiment of the device for roll bending, the first and second spatial directions are orientated substantially mutually perpendicular. This measure makes bending possible about two bending axes which extend substantially mutually perpendicular.

In an improvement of the device for roll bending, the first axis of rotation extends substantially perpendicular to the first spatial direction. In this context, the bending head is further coupled to the frame in such a way that, for bending the profile about the first bending axis, the bending head can carry out a combined rotational and translational movement with respect to the frame, in which the rotation about the first axis of rotation is simultaneous with the translation in the first spatial direction. Again, as a result, optimum orientation of the passage of the second bending roller set with respect to the entering profile is possible.

In an advantageous and preferred embodiment of the device for roll bending, the device comprises at least one first connecting component and at least one second connecting component. In this context, each of the first and second connecting components connects the bending head to the frame via articulated connections, in such a way that, together with the connecting components, regions of the bending head and the frame which are arranged between the articulated connections form a four-bar linkage, which makes possible the combined rotational and translational movement of the bending head with respect to the frame for bending the profile about the first bending axis. For example, the first bending axis may be a principal bending axis of the profile. Four-bar linkage kinematics of this type can be configured in such a way, by appropriately positioning and spacing the articulated connections, that the translation of the bending head in the first spatial direction is brought about simply as a result of the desired rotational movement of the bending head about the first axis of rotation, because of the coupling of the bending head to the frame via the connecting elements. The translational movement in the first spatial direction and the rotational movement about the first axis of rotation can therefore be brought about for example by means of a single positioning means.

In one embodiment of the device for roll bending, the first and second connecting components each couple two of the articulated connections together in a cross.

In accordance with a development of the device for roll bending, the second bending roller set is formed with at least one pair of bending rollers, which comprise roller axes of rotation which extend mutually parallel. By means of the bending roller pair, the profile can be guided securely from two opposite sides thereof during the bending.

In a further development of the device for roll bending, the second bending roller set is formed with two pairs of bending rollers, the roller axes of rotation of the bending rollers of each pair extending mutually parallel. As a result, the position of the profile can be fixed in a defined manner in a plane normal to the trajectory thereof during the guidance.

In accordance with another further development of the device for roll-bending, the second bending roller set is coupled to the bending head in such a way that the second axis of rotation is always parallel to the roller axes of rotation of one of the pairs of bending rollers of the second bending roller set. The second bending roller set can thus be rotated about the second axis of rotation in such a way that the bending rollers of the pair roll off on the profile.

In an advantageous embodiment of the device for roll bending, the second bending roller set is coupled to the bending head in such a way that, for the bending about the second bending axis, the rotation about the second axis of rotation can be brought about simultaneously with the translation in the second spatial direction. As a result, optimum orientation of the passage of the second bending roller set with respect to the profile can achieved even during the bending about the second bending axis.

In a further embodiment of the device for roll bending, the roller axes of rotation of the bending rollers of the second bending roller set are positioned in a plane, resulting in the second bending roller set being able to rotate about the first and second axes of rotation without significant restriction of the bending radii which can be achieved.

In a development of the device for roll bending, the second bending roller set is further coupled to the bending head in such a way that the second bending roller set can be rotated with respect to the first bending roller set about a third axis of rotation, which extends substantially tangential to a trajectory of the profile in a region of the profile which is received in the passage of the second bending roller set, so as to provide the profile with a twist, at least in regions, in addition to the bending about the first bending axis and about the second bending axis. This increases the freedom of configuration as regards the three-dimensionally bent shape of a profile which is roll-bent by means of the device.

In a further improvement of the device for roll-bending, the bending rollers of the first bending roller set and the bending rollers of the second bending roller set are mounted so as to be freely rotatable about the respective roller axes of rotation thereof. As a result of this measure, the bending rollers are set in rotation about the roller axes of rotation thereof purely by way of the insertion of the profile, it being possible in the bending rollers of the second bending roller set for an angular velocity resulting from the rotation about the first and second axes of rotation to be superposed on the rotation of the bending rollers about the roller axes of rotation thereof. Because in this context the bending rollers are not driven to transport the profile, the profile surface is handled gently by the device during the bending.

In a further advantageous embodiment of the device for roll-bending, the device further comprises an entry guide. The entry guide comprises one or more sets of guide rollers for guiding the profile and for preventing the profile from buckling. In this context, the entry guide is arranged in such a way that the profile which is inserted into the entry guide enters the passage of the first bending roller set at the output end of the entry guide after passing through it. In this context, the guide rollers are mounted so as to be freely rotatable about the respective roller axes of rotation thereof, and additionally contribute to the prevention of damage to the surface of the profile. The entry guide advantageously makes it possible to guide the inserted profile into the passage of the first bending roller set in a defined orientation without buckling.

The above embodiments and developments can be combined with one another as desired, within reason. Further possible embodiments, developments and implementations of the invention include combinations which are not actually explicitly mentioned of features of the invention which are described in the above or in the following with reference to the embodiments. In particular, in this context the person skilled in the art may also add individual aspects to each basic form of the present invention as improvements or supplements.

BRIEF DESCRIPTION OF THE DRAWINGS

The present invention is described in greater detail in the following by way of the embodiments shown in the schematic drawings, in which.

Figure 1:
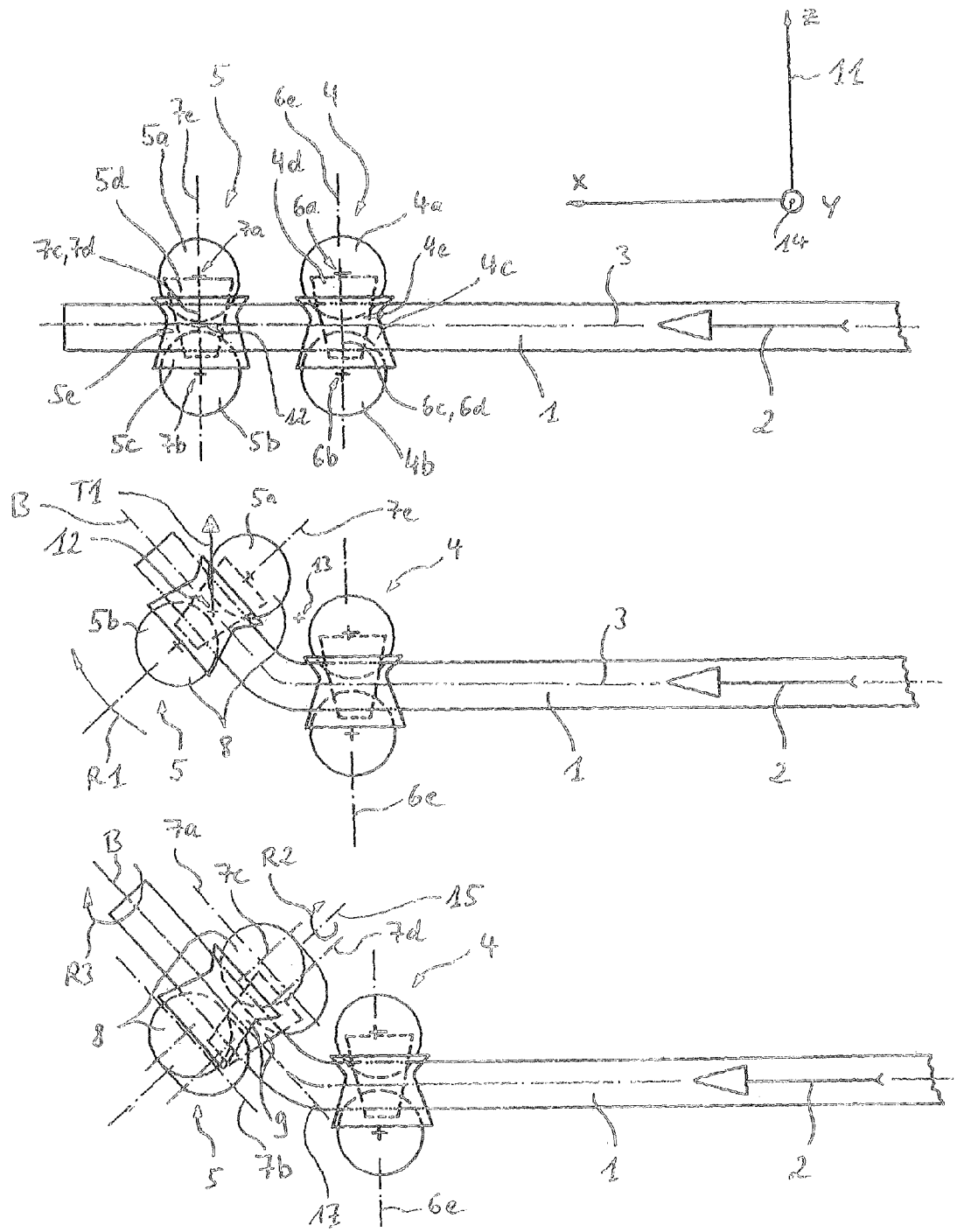
FIG. 1 is a schematic illustration of the roll-bending of a profile in accordance with an embodiment of the invention, in a side view, three different successive stages of a roll-bending process being shown above one another by way of example.

The appended drawings are intended to give an improved understanding of the embodiments of the invention. They illustrate embodiments and serve, in connection with the description, to explain the principles and concepts behind the invention. Other embodiments, and many of the stated advantages, can be seen from the drawings. The elements of the drawings are not necessarily shown to scale with one another.

DETAILED DESCRIPTION OF THE INVENTION

In the drawings, like, functionally equivalent and identically operating elements, features and components are provided with like reference numerals in each case, unless stated otherwise.

In FIG. 1, the roll-bending of a profile 1 in accordance with one embodiment of the invention is shown in a side view. As is shown in the uppermost part of FIG. 1, the profile 1 is inserted between bending rollers 4a-d and 5a-d of a first bending roller set 4 and a second bending roller set 5, in an insertion direction 2, which extends, in the upper part of FIG. 1, substantially parallel to an x spatial direction and parallel to a longitudinal direction 3 of the profile 1, which is still straight. A passage 4e is formed between the bending rollers 4a, 4b, 4c and 4d of the first bending roller set 4, whilst a passage 5e is formed between the bending rollers 5a, 5b, 5c and 5d of the second bending roller set 5. The configuration of the bending rollers 4a-d, 5a-d and the passages 4e and 5e will be discussed in greater detail in the following with reference to FIG. 3. During the insertion, the profile 1 is guided into the passages 4e and 5e, which are shaped appropriately for this purpose, in the insertion direction 2.

The uppermost part of FIG. 1 shows the first bending roller set 4 and the second bending roller set 5 in a position, with respect to one another, in which the profile 1 passes through the passages 4e and 5e in a straight line, without being bent. Roller axes of rotation 6a, 6b, 6c and 6d of the bending rollers 4a-4d and roller axes of rotation 7a, 7b, 7c and 7d of the bending rollers 5a-5d are positioned in a plane 6e or 7e respectively. In the uppermost part of FIG. 1, the planes 6e and 7e appear projecting, and extend substantially mutually parallel.

So as to subject the profile 1 to roll-bending, a translational movement of the second bending roller set 5 with respect to the first bending roller set 4, which is fixed in space, is carried out in a first spatial direction 11, which corresponds to the z spatial direction in FIG. 1. In addition, in the central sub-drawing of FIG. 1, the second bending roller set 5 rotates about a first axis of rotation 12, which is shown projecting in the central sub-drawing. The translation in the first spatial direction 11 is denoted by the reference numeral T1, and the rotation about the first axis of rotation 12 is denoted by the reference numeral R1. In the central sub-drawing of FIG. 1, the two planes 6e and 7e are no longer parallel, but are shown projecting as before. As a result of the combined translational and rotational movements T1 and R1 of the second bending roller set 5 with respect to the first bending roller set 4, as the profile 1, inserted in the insertion direction 2, passes through the first bending roller set 4 and the second bending roller set 5, it is bent about a first bending axis (or principal bending axis) 13, which in FIG. 1 is also shown projecting in the central sub-drawing and extends through the central point of an osculating circle on an appropriate central line of the profile. The first bending axis 13 thus extends parallel to the y spatial direction.

The lower sub-drawing of FIG. 1 shows a further stage of the roll-bending in accordance with an embodiment of the roll-bending method according to the invention. The lower sub-drawing of FIG. 1 illustrates a translation of the second bending roller set 5 with respect to the first bending roller set 4 in a second spatial direction 14, which in FIG. 1 corresponds to the y spatial direction. This second translation is not denoted in FIG. 1, but can be seen from FIG. 2, where it is denoted by the reference numeral T2. It takes place in the negative y direction. In addition, in the lower sub-drawing of FIG. 1, the second bending roller set 5 rotates about a second axis of rotation 15, which is positioned in the plane 7e in which the roller axes of rotation 7a-7d also come to lie. In the lower sub-drawing of FIG. 1, the plane 7e is no longer shown projecting. The rotation about the second axis of rotation 15 is denoted by the reference numeral R2. As a result of the rotation R2 of the second bending roller set 5 with respect to the first bending roller set 4, the profile 1 is bent about a second bending axis 16, which extends parallel to the z spatial direction (see the lower sub-drawing of FIG. 2).

Figure 2:
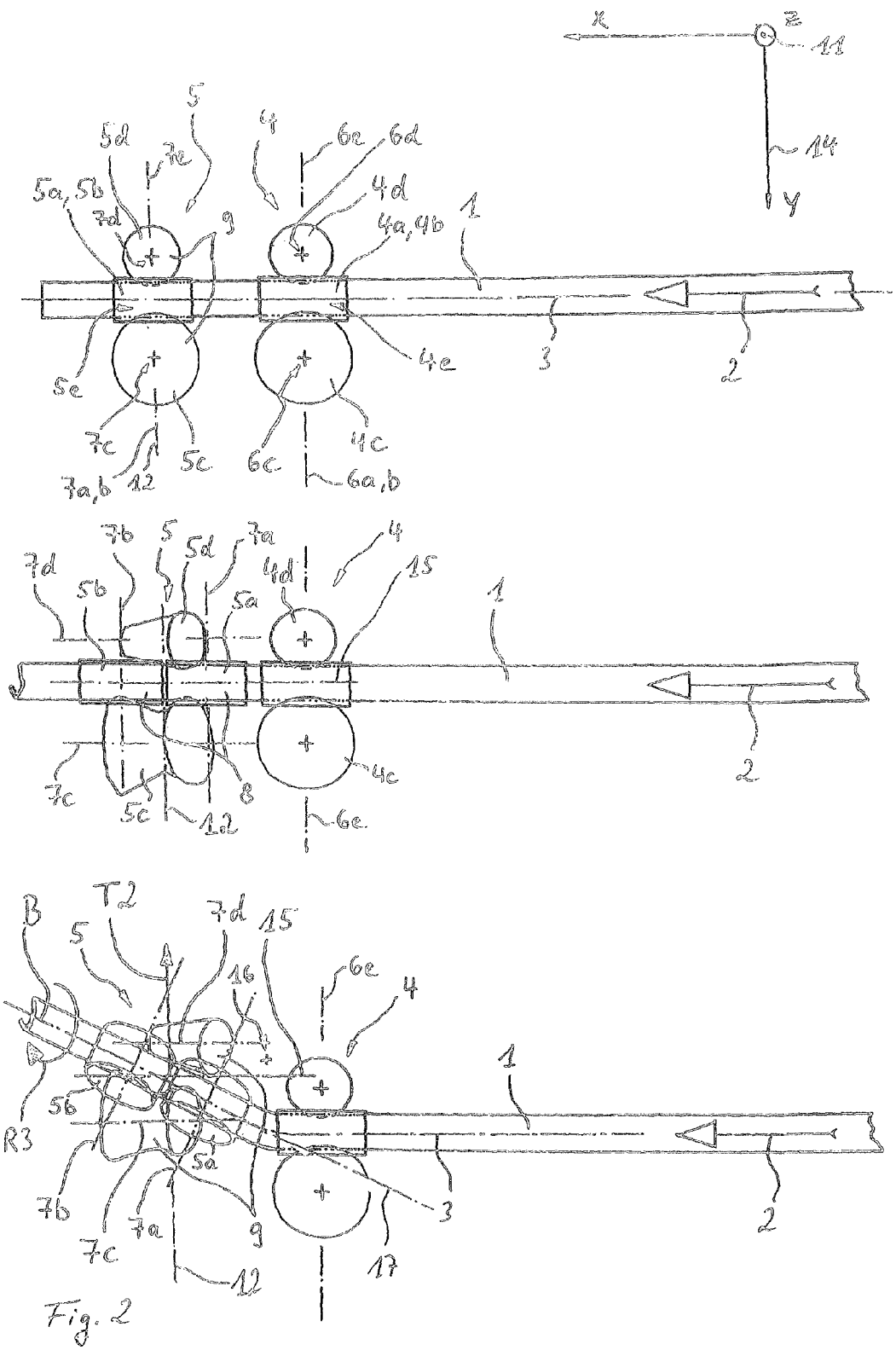
FIG. 2 gives a plan view of each of the stages shown in FIG. 1 of the roll-bending process.

In the embodiment of the method according to the invention as shown in FIGS. 1 and 2, the first and second spatial directions 11 and 14 thus extend substantially perpendicular to the insertion direction 2 of the profile 1. The two spatial directions 11 and 14 are further substantially mutually perpendicular. Whilst the first axis of rotation 12 extends substantially perpendicular to the first spatial direction 11 and substantially parallel to the y direction, the second axis of rotation 15, which is non-parallel to the first axis of rotation 12, is orientated substantially perpendicular to the second spatial direction 14 in the stages of the roll bending shown in FIGS. 1 and 2. The directions x, y, z form an orthogonal coordinate system.

FIG. 2 illustrates the three stages of the roll bending shown in FIG. 1 again in a plan view (viewed in the negative z direction). The second bending axis 16 can be seen from the lowest sub-drawing of FIG. 2, where it again extends in a projecting manner.

In relation to the method for roll-bending as shown in FIGS. 1 and 2 and described above, it should be noted that the rotations R1, T1, R2 and T2 need not necessarily be carried out in the order shown. Depending on the desired bent shape of the profile 1, in other words depending on the desired trajectory B which the longitudinal direction 3 of the profile 1 is to follow after the bending, the rotations and translations R1, R2, T1, T2 may be temporally offset, temporally overlapping or even entirely simultaneous, in an appropriate sequence which is selected in advance.

Preferably, however, the rotation R1 about the first axis of rotation 12 is simultaneous with the translation T1 in the first spatial direction 11, so as to orientate the second bending roller set 5 in such a way that the profile 1 enters the passage 5e substantially perpendicular to the plane 7e, so as to handle the profile surfaces gently and introduce the forces required for bending substantially normal to the profile surface.

The bending rollers 4a-d and 5a-d of FIGS. 1 and 2 guide the cross-section of the profile 1 on all sides, and for this purpose are arranged about the respective passage 4e, 5e in such a way that roller axes of rotation 6a-d, 7a-d of the bending rollers 4a-d, 5a-d extend mutually parallel in pairs in each case. Specifically, the roller axes of rotation 7a, 7b of the bending rollers 5a, 5b extend mutually parallel, and parallel to the y direction in the upper sub-drawing of FIG. 1, whilst the roller axes of rotation 7c, 7d of the bending rollers 5c, 5d extend mutually parallel, and parallel to the z direction in the upper sub-drawing of FIG. 1.

Similarly, the roller axes of rotation 6a, 6b of the bending rollers 4a, 4b extend mutually parallel and parallel to the y direction, whilst the roller axes of rotation 6c, 6d of the bending rollers 4c, 4d extend mutually parallel and parallel to the z direction.

The bending rollers 5a, 5b form a pair 8 and the bending rollers 5c, 5d form a pair 9. In the method of the embodiment of FIGS. 1 and 2, the second axis of rotation 15 is always orientated in such a way that it extends parallel to the roller axes of rotation 7c, 7d of the pair 9.

Preferably, the rotation R2 about the second axis of rotation 15 is also simultaneous with the translation T2 in the second spatial direction 14, so as to be able to orientate the plane 7e at the point where the profile 1 passes through the passage 5e substantially perpendicular to the longitudinal direction 3 of the profile 1, which follows the trajectory B, even during the bending of the profile 1 about the second bending axis 16 (or subsidiary bending axis).

Preferably, the second bending roller set 5 is moved by means of appropriate positioning means (not shown in FIGS. 1 and 2), which are preferably operated with program control (for example CNC control). Further, the drawings of FIGS. 1 and 2 should only be interpreted as schematic, in particular as regards the size ratios and contours of the bending rollers 4a-d and 5a-d. An exemplary possibility, for configuring the bending rollers 4a-d and 5a-d in accordance with one embodiment of the invention, is explained in greater detail in the following with reference to FIG. 3.

In addition to the rotations R1, R2 shown in FIG. 1 and FIG. 2, the second bending roller set 5 can also be rotated about a third axis of rotation 17 with respect to the first bending roller set 4, either simultaneously with the two rotations R1, R2 and the translations T1, T2 or temporally offset therefrom or even temporally overlapping therewith. This rotation is denoted by the reference numeral R3. However, the positions shown in FIGS. 1 and 2 of the bending rollers 5a-d do not reflect the rotation R3. As can be seen from the lowermost sub-drawings of FIGS. 1 and 2, the third axis of rotation 17 extends substantially tangential to the trajectory B of the profile 1 in a region of the profile 1 which is received in the passage 5e of the second bending roller set 5. In this context, the third axis of rotation 17 is orientated in a direction substantially perpendicular to the plane 7e. For example, in the region of the profile 1 which is received in the passage 5e of the second bending roller set 5, the third axis of rotation 17 may touch the trajectory B thereof, and pass through an appropriately selected point, for example an appropriately defined central point, of the profile cross-section in the plane 7e. The two axes of rotation 12 and 15 may also intersect at this central point. As a result of the third rotation R3 of the second bending roller set 5 with respect to the first bending roller set 4, the profile which is to be bent can be provided with a twist, at least in regions, in addition to the bending about the first bending axis 13 and about the second bending axis 16. This means that for example a twist angle can disappear over one or more parts of the longitudinal extent of the profile 1, whilst in other portions of the profile 1 it is non-zero as desired, or varies continuously between a predetermined value and a zero value.

In the embodiment of FIGS. 1 and 2, the bending rollers 4a-d and the bending rollers 5a-d are not driven in rotation by means of an electrical or other drive, but instead can rotate freely. The bending rollers 4a-d, 5a-d are thus each set in rotation about the respective roller axes of rotation 6a-d and 7a-d thereof by the movement of the profile 1 during the insertion thereof in the insertion direction 2, by way of the surface contact with the bending rollers 4a-d, 5a-d. In this context, the bending rollers 4a-d, 5a-d should roll off on the profile surface with substantially no slip.

In the following, the first and second bending roller sets 4 and 5, as they may be configured to carry out the method of FIGS. 1 and 2, are described in greater detail. The bending rollers 4a-d, 5a-d of the first bending roller set 4 and the second bending roller set 5 may be configured and arranged in substantially the same manner.

Figure 3:
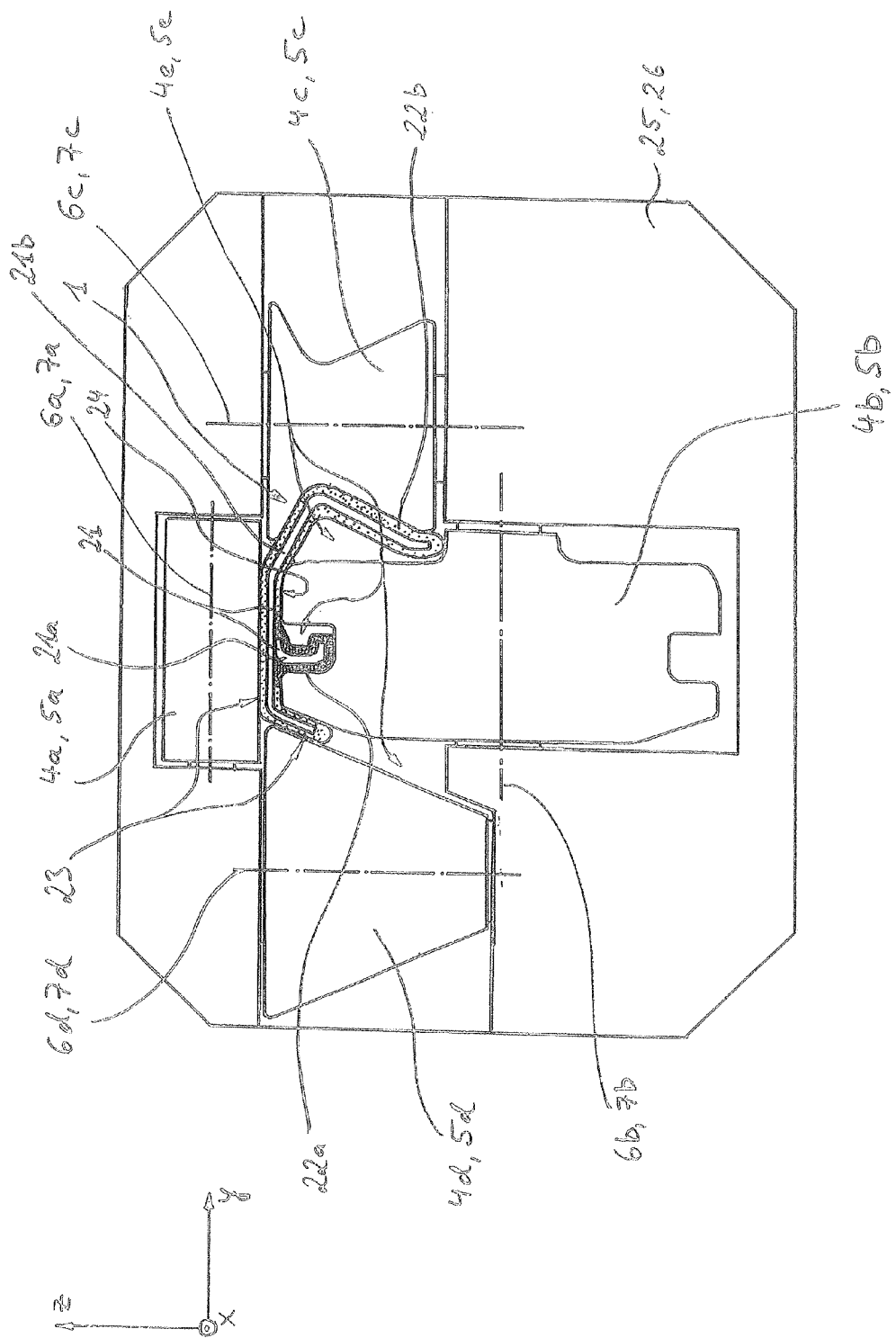
FIG. 3 gives a schematic front view of a first or second exemplary bending roller set, carried by a frame, and a cross-section of an exemplary profile.

FIG. 3 is a front view of one of the bending roller sets 4 or 5, that is to say a view substantially perpendicular to the plane 6e or 7e in which the roller axes of rotation 6a-6d or 7a-7d are positioned.

In the neutral position, shown in the uppermost sub-drawings of FIGS. 1 and 2, of the two bending roller sets 4, 5 with respect to one another, the roller axes of rotation 6a, 7a and 6b, 7b are orientated substantially parallel to the y direction. The roller axes of rotation 6c and 6d of the bending rollers 4c and 4d of the first bending roller set 4 and the roller axes of rotation 7c and 7d of the two bending rollers 5c and 5d of the second bending roller set 5 are orientated substantially parallel to the z direction. As is shown in FIG. 3, the roller axes of rotation of the bending rollers 4a-d, 5a-d of one of the bending roller sets 4, 5 are positioned in a plane 6e or 7e respectively, and are mutually spaced in such a way that a passage 4e, 5e for guiding the profile 1 is formed between the rollers.

FIG. 3 also shows the profile 1 in a cross-section. In this cross-section, it can be seen that, in the case shown in FIG. 3 by way of example, the profile 1 comprises a reinforcement 21 composed of two metal profiles 21a, 21b, the reinforcement 21 having been embedded in two different plastics materials by an extrusion method. In this context, in a first cross-sectional region 22a which is shown darker and cross-hatched in FIG. 3, the profile 1 comprises a first plastics material, which has been extruded around a sub-region of the reinforcement 21. In a second cross-sectional region 22b, a second plastics material is shaped around a second sub-region of the reinforcement 21 by extrusion. The metal profiles 21a, 21b are for example produced from steel.

The respective contour of the generated surfaces of the individual bending rollers 4a-d, 5a-d is selected in such a way that the bending rollers 4a-d, 5a-d make it possible to receive and guide the profile 1, which is shaped with an irregular cross-section and in the example shown is open downwards in the manner of a channel, in the intermediate space 4e, 5e. As is shown in FIG. 3, for this purpose the bending rollers 4a-d, 5a-d roll off on a large part of the profile surface, both on the outside 23 and on the inside 24 of the profile 1.

FIG. 3 further illustrates that the bending rollers 4a-d of the first bending roller set 4 are mounted in a frame 25, in a manner not shown in detail, so as to be freely rotatable about the roller axes of rotation 6a-d thereof. In the same way, the bending rollers 5a-d of the second bending roller set 5 are mounted so as to be freely rotatable in a frame 26. As is illustrated in FIGS. 1 and 2, the frame 25 for the first bending roller set 4 can remain in a fixed position in space, whilst the frame 26 which carries the second bending roller set 5 can be moved in space with respect to the frame 25 in an appropriate manner, as was described in relation to FIGS. 1 and 2. FIG. 3 merely illustrates the frames 25 and 26 schematically.

In addition, it would be advantageous for a filler piece (not shown in FIG. 3 for improved clarity) to be inserted between the limbs of the profile 1 in the region 10. This region 10 is defined as the internal region between the inwardly bent limbs of the profile 1. In this case, the filler piece has the function of improved bracing of the profile 1, and this is particularly advantageous for reasons of stability. A hard material is preferably used as the material for the filler piece. It is particularly preferred for a hard plastics material, such as PEEK (polyether ether ketone) to be used as the filler piece.

Figure 4:
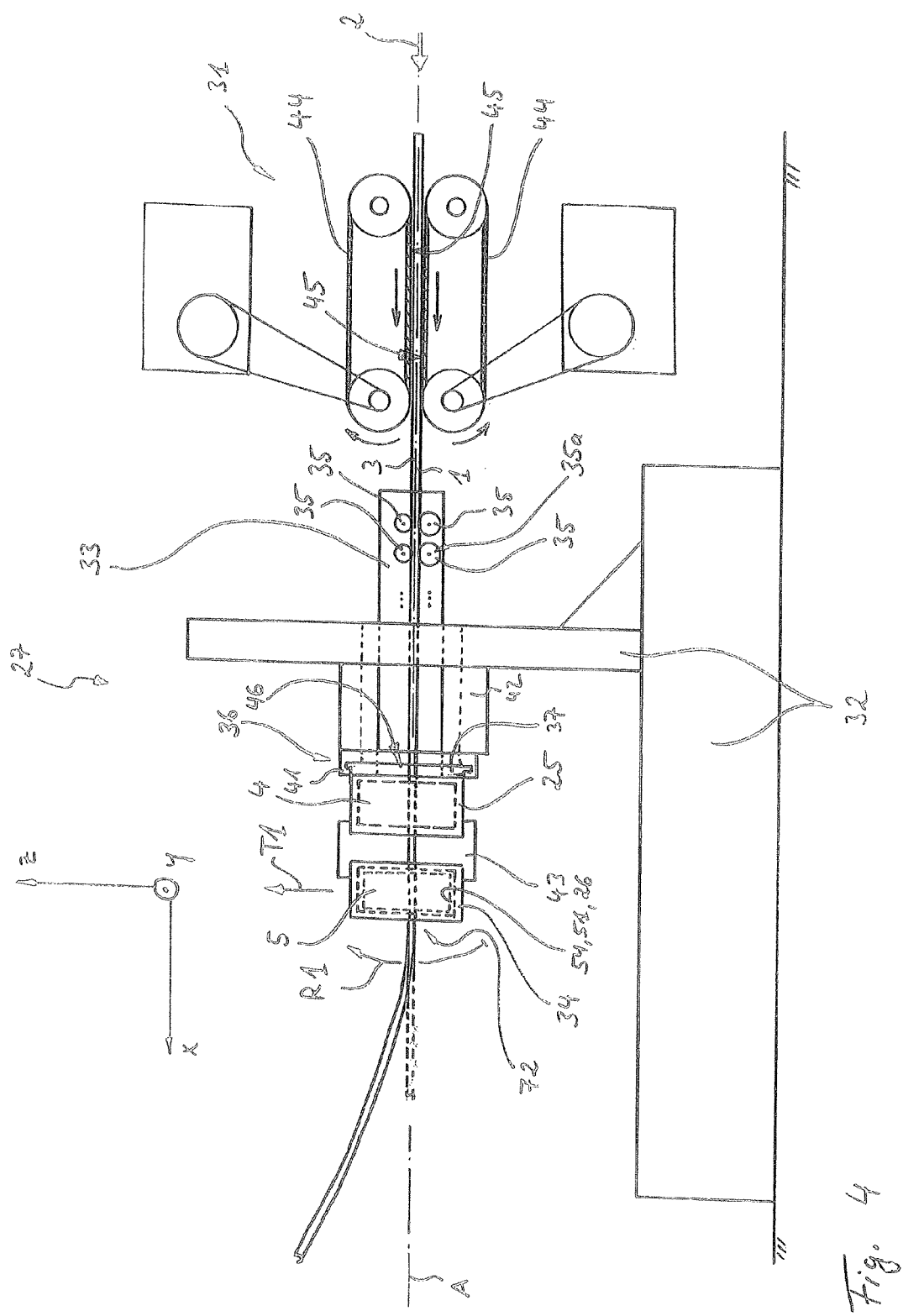
FIG. 4 is a schematic side view of a device for roll-bending, a discharge conveyor arrangement for inserting the profile also being shown.

FIG. 4 is a side view of a device 27 for roll-bending a profile 1 in accordance with one embodiment of the invention and of a discharge conveyor arrangement 31. The device 27 serves to carry out the method described by way of example with reference to FIGS. 1 and 2, and comprises a fixed, substantially rigid substructure 32, on which an entry guide 33, a frame 25 which carries the first bending roller set 4, and a bending head 34 which carries a frame 26 comprising a second bending roller set 5 are arranged. The bending roller sets 4 and 5 are not shown in detail in FIG. 4, but are preferably configured as described with reference to FIG. 1-3.

The entry guide 33 is provided with a plurality of pairs of guide rollers 35 and fixed to the substructure 32. For example, approximately five to ten pairs of guide rollers 35 may be provided, and are mounted, uniformly mutually spaced on a base body (not described in greater detail) of the entry guide 33, so as to be freely rotatable. In this context, the guide rollers 35 may likewise be appropriately contoured in the region of the generated surface thereof for guiding the profile 1. In the same way as the bending rollers 4a-d, 5a-d, the guide rollers 35 are not driven by an electric-motor or other drive so as to transport the profile 1.

The frame 25 which carries the first bending roller set 4 is also fixed to the substructure 32. Advantageously, the frame 25 comprising the first bending roller set 4 is rigidly connected to the entry guide 33 at a defined orientation thereto. The frame 25—which need not necessarily be of a geometric configuration corresponding to that which is shown merely schematically in FIG. 3, but may also be of a different geometric configuration depending on the requirements—is coupled to the substructure 32 in such a way, by means of an adjustment means 36, that the frame 25 can be rotated together with the entry guide 33 about an axis A, which in the region of the entry guide substantially corresponds to a longitudinal direction 3 of the profile 1. The rotation about the axis A leads to rotation of the coordinate system x, y, z about the x direction. In this way, the spatial orientation of the bending roller set 4 and the guide rollers 35 of the entry guide 33 can be orientated with respect to the orientation of the profile 1, which is inserted into the entry guide 33 in the insertion direction 2. In the embodiment shown in FIG. 4, the ability to rotate about the axis A is achieved in that the frame 25, which is for example rigidly screwed to the base body of the entry guide 33, is provided with a flange 37, which is formed round in the peripheral direction thereof and is engaged from behind by projections 41 of a support component 42, through which the entry guide 33 is guided. In the embodiment of FIG. 4, the orientation of the entry guide 33 and the space 25 with respect to the support component 42 is fixed by clamping the flange 37 to the projections 41 by means of one or more screws.

The bending head 34 is connected to the frame 25 by means of a connecting means 43 in such a way that the bending head 34 can carry out the translation T1 described with reference to FIGS. 1 and 2 and the rotation R1 which was likewise described with reference to these drawings. The connecting means 43 thus establishes the movability of the bending head 34 with respect to the frame 25. Forces required for bending the profile 1, which are necessary for carrying out the rotation R1 and the translation T1, are applied by means of one or more adjustment means (not shown in FIG. 4), for example electric motors or pneumatic or hydraulic cylinders.

The second bending roller set 5 itself is carried by the frame 26, which is movable with respect to the bending head 34. Because of the movability of the frame 26, the second bending roller set 5 can carry out the rotations R2 and R3 described with reference to FIGS. 1 and 2 and the translation T2. For this purpose, the frame 26 is coupled to the bending head 34 in an appropriate manner, as will be explained in greater detail in the following with reference to FIG. 5.

To bend a profile, for example the profile 1 shown in FIG. 3, the profile 1 is inserted into the entry guide 33 in the insertion direction 2. In the embodiment of FIG. 4, this insertion is provided by the discharge conveyor arrangement 31, which comprises two endless belts 44, of which one is arranged above and one below the profile 1. As is shown in FIG. 4, in portions the belts 44 extend mutually parallel and parallel to the insertion direction 2, which in the region of the discharge conveyor arrangement 31 corresponds to the longitudinal direction 3 of the profile 1. The surfaces 45 of the belts 44 which face the profile 1 are made sufficiently flexible to protect the profile 1 transported between the belts 44 from surface damage and at the same time to provide effective, slip-free insertion of the profile 1 into the device 27. Instead of the belts 44, correspondingly formed track rollers may also be used.

The profile 1 exiting the discharge conveyor arrangement 31 subsequently passes through between the guide rollers 35 of the entry guide 33, which guides the profile 1 and in particular prevents the profile 1 from buckling laterally or upwards or downwards under the force exerted for the insertion. As a result of the insertion movement of the profile 1, the freely rotating guide rollers 35 are set in rotation about the roller axes of rotation 35a thereof.

At the output end 46 of the entry guide 33, the profile 1 enters the passage 4e of the first bending roller set 4. The profile 1 passes through the first bending roller set 4 and the second bending roller set 5. Once the profile 1 has been guided by both bending roller sets 4, 5, the second bending roller set 5, preferably controlled by a predetermined program, can carry out the rotation R1 and the translation T1, as described with reference to FIGS. 1 and 2, whilst the frame 26, also preferably with program control, is moved with respect to the bending head 34 and carries out the rotations R2 and R3 and the translation T2. In this way, the profile 1 is transferred from the straight shape thereof (shown in FIG. 4 in dashed lines) into a freely three-dimensionally bent shape.

Figure 5:
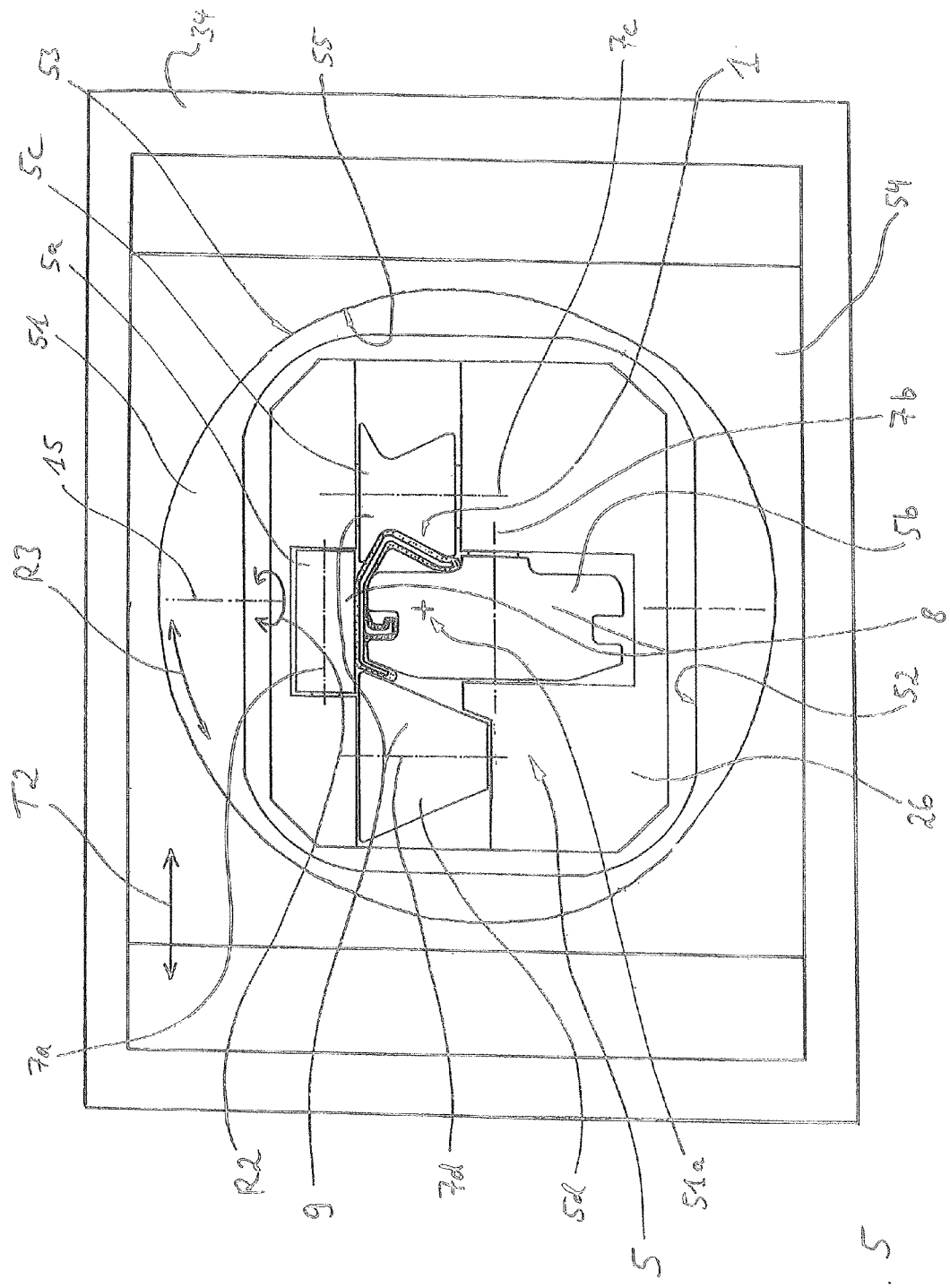
FIG. 5 is a schematic front view of a bending head of the device in accordance with the embodiment of FIG. 4.

FIG. 5 shows how, in the embodiment of FIG. 4, the frame 26 which carries the bending rollers 5a-b of the second bending roller set 5 can be coupled to the bending head 34 (only shown schematically in FIG. 5) in such a way that the second bending roller set 5 can carry out the rotations R2 and R3 and the translation T2. The frame 26 is formed in approximately the same way as the frame 26 shown in FIG. 3, and the bending rollers 5a-d are also mounted in the frame 26, as described with reference to FIG. 3. The frame 26 itself is mounted on a sleeve 51 so as to be rotatable about the second axis of rotation 15 shown previously in FIGS. 1 and 2, the second axis of rotation 15 being positioned in the plane 7e, in which the roller axes of rotation 7a-d of the bending rollers 5a-d are also positioned, and always extending parallel to the roller axes of rotation 7c, 7d. The sleeve 51 comprises a through-opening 52, in which the frame 26 is received with sufficient play on all sides. The sleeve 51 further comprises a substantially cylindrical outer peripheral surface 53, which serves to mount the sleeve 51 in a corresponding circular recess 55 of a displaceable slide 54. The fact that the slide 54 can be displaced makes the translational movement T2 of the second bending roller set 5 possible. By contrast, the fact that the sleeve 51 can rotate about a central axis 51a of the outer peripheral surface 53 makes the rotation R3 of the second bending roller set 5 possible, and the fact that the frame 26 can be pivoted in rotation about the second axis of rotation 15 makes the rotational movement R2 possible.

So as to be able to bend the profile 1 by means of the rotations R2, R3 and the translation T2, forces and optionally torques have to be applied to the profile 1 by means of the second bending roller set 5. This is preferably achieved by means of positioning means (not shown in FIG. 5) which make it possible to displace the slide 54 with respect to the bending head 34, to rotate the sleeve 51 in the recess 55, and to pivot the frame 26 with respect to the sleeve 51 about the second axis of rotation 15. These positioning means may for example be electric motors, but may also be pneumatic or hydraulic cylinders, which in each case are coupled to the aforementioned components in an appropriate manner.

Figure 6:
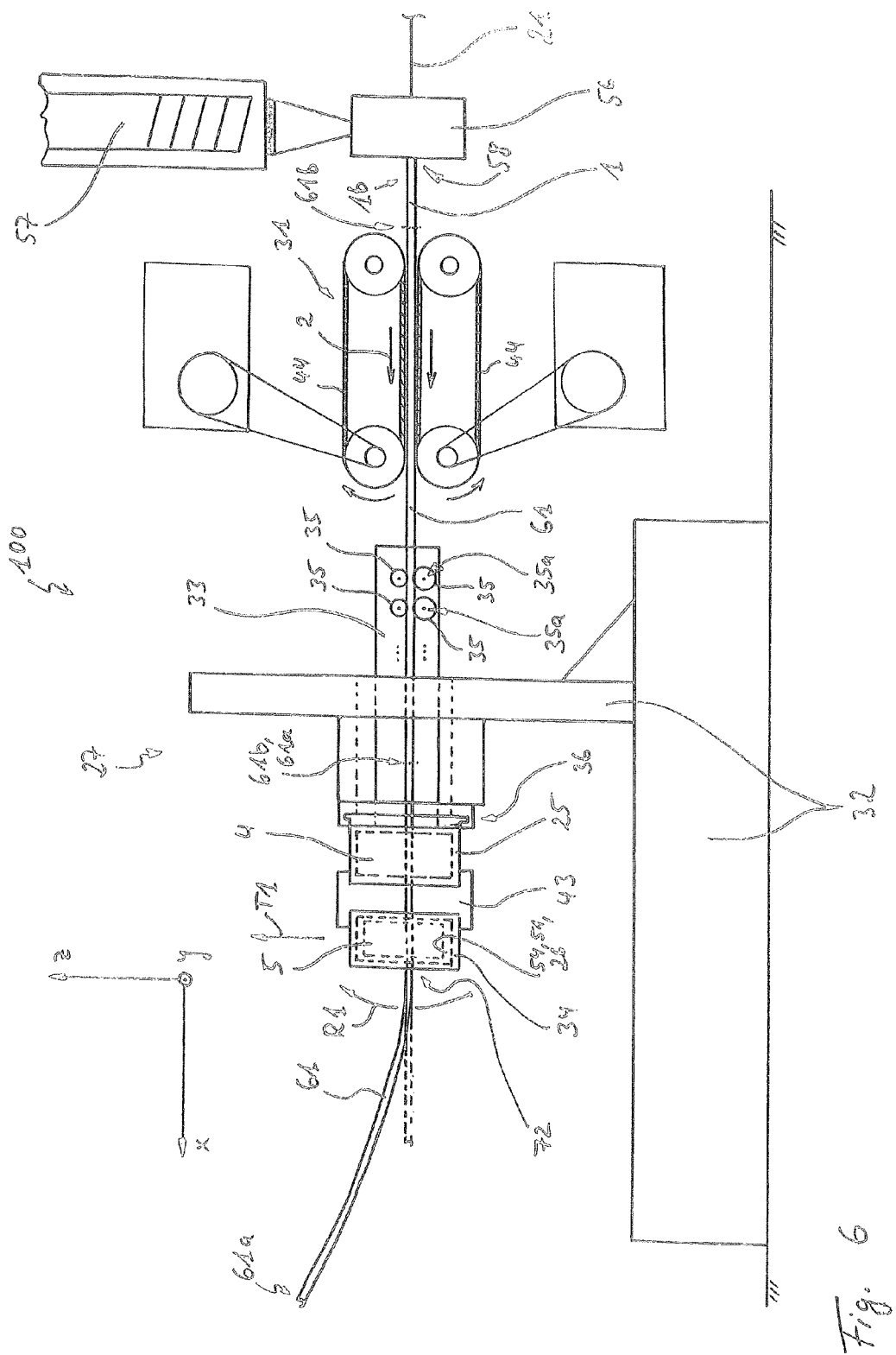
FIG. 6 shows an extrusion and roll-bending line in accordance with a further embodiment of the invention, comprising a device for roll-bending, a discharge band arrangement, and an extrusion tool, an extruder additionally being schematically shown.

FIG. 6 is a schematic side view of a device 27 for roll-bending a profile 1, a discharge belt arrangement 31, and an extrusion tool 56 comprising an extruder 57 attached thereto. The orientation of the extruder 57 with respect to the extrusion tool 56 is only shown schematically and by way of example; the extruder 57 can be arranged in any suitable manner for extruding the profile 1 with respect to the extrusion tool 56.

The device 27, the discharge conveyor arrangement 31 and the extrusion tool 56 comprising the extruder 57 are components of an extrusion and roll-bending line 100. By means of the extrusion and roll-bending line 100, bent profile workpieces 1a can be produced from the profile 1.

To produce the profile 1, a reinforcement 21, formed from for example one or more metal profiles 21a, 21b, can be introduced continuously into the extrusion tool 56 and enclosed in the extrusion tool 56 by a plastics material which is melted on in the extruder 57, resulting in the reinforcement 21 being embedded in the plastics material and for example the profile 1 being produced with a cross-section as shown in FIG. 3. Once the profile 1 has exited the extrusion tool 56 on the output side 58 thereof, the plastics material cools down and solidifies. After a distance which is shown shortened in FIG. 6, the profile 1 is transported by means of the discharge conveyor arrangement 31 and inserted into an entry guide 33 of the device 27, as described previously with reference to FIG. 4. The device 27 is formed substantially in the same way as that of the embodiment of FIG. 4, and makes it possible to roll-bend the profile 1 in accordance with FIGS. 1 and 2.

In the embodiment as shown in FIG. 4, straight profile pieces which have already been cut to length can also be inserted into the device 27 for roll-bending the profile 1 by means of the discharge conveyor arrangement 31. However, the extrusion and roll-bending line 100 according to FIG. 6 is even more advantageous. In this context, the profile 1 is roll-bent in what is known as 3D inline roll-bending. This means that the production of the profile 1 as a straight, continuous strand 1b, and subsequently the roll-bending of successive portions of this strand 1b by means of the device 27, can take place within a single production line. For example, the successive portions can each be bent into shape freely in the same way by means of a predefined control program. FIG. 6 shows a portion of this type of the profile 1, having reference numeral 61, the ends thereof being denoted by the reference numerals 61a and 61b. Thus, with the extrusion and roll-bending line 100 of FIG. 6, the roll-bending of successive portions 61 of the profile 1 is achieved in a particularly economical manner, since it is not necessary initially to extrude the profile as a straight, continuous strand, subsequently to cut straight pieces to length, and subsequently to introduce the pieces which have been cut to length into a separate bending device. In this way, the labour time and space requirement are reduced. Further, material losses, which may occur when continuously cutting the continuous strand to length and only bending subsequently, are also reduced.

Figure 7:
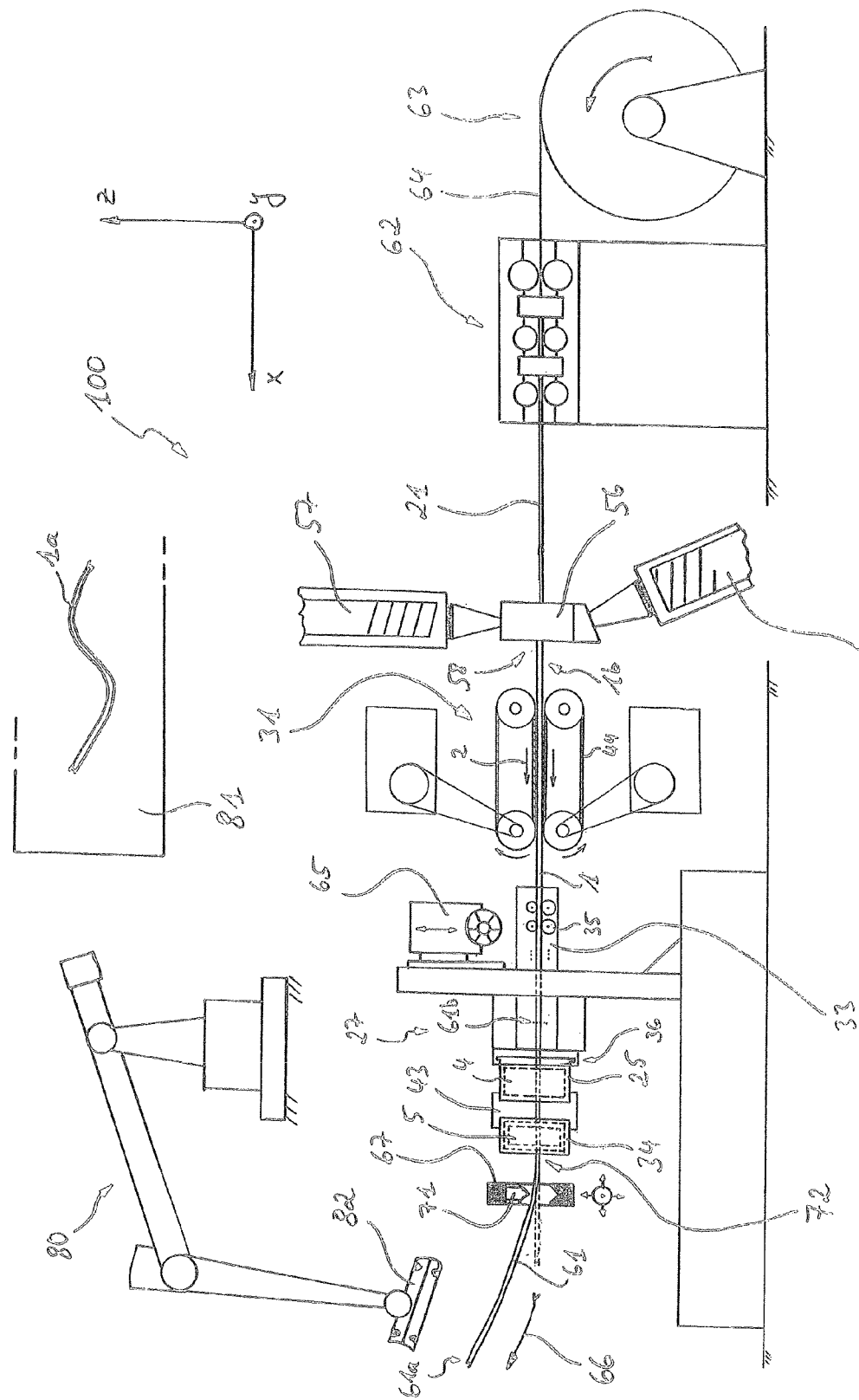
FIG. 7 shows an extrusion and roll-bending line in accordance with a further embodiment of the invention, again in a side view.

An extrusion and roll-bending line 100 in accordance with a further embodiment of the invention is illustrated in FIG. 7. As was described with reference to FIG. 6, a device 27 for roll-bending a profile 1 is again provided. The extrusion and roll-bending line 100 of FIG. 7 further comprises a discharge conveyor arrangement 31 and an extrusion tool 56, which in the case of FIG. 7 is now supplied by two extruders 57, so as to form the profile 1 with a plurality of cross-sectional regions formed from different plastics materials.

The extrusion and roll-bending line 100 of FIG. 7 additionally comprises a further deformation means 62, which serves to produce a reinforcement 21 within the extrusion and roll-bending line. A planar metal band 64 is rolled off from a stock roll 63 and brought into a suitable cross-sectional shape by way of the deformation means 62 (not shown in detail in FIG. 7), for example by means of a series of rollers and/or drums, and subsequently forms a metal profile, for example the metal profile 21b as shown in FIG. 3. A second deformation means 62 (not shown in FIG. 7) may also be provided, and produces a second metal profile 21a, which can subsequently be brought to the metal profile 21b, and optionally connected thereto, before the introduction into the extrusion tool 56.

The reinforcement 21 which is formed in this manner now enters the extrusion tool 56 again, where it is embedded in one or more plastics materials. The profile exits the extrusion tool 56 as a continuous strand 1b, which is inserted, once it has cooled sufficiently, into the entry guide 33 of the device 27 by means of the discharge conveyor arrangement 31. The roll-bending of successive portions 61 of the profile 1 is carried out as described above with reference to FIG. 6.

The coupling of the frame 26 and the bending head 34 as disclosed with reference to FIG. 5 is preferably made use of in the embodiment of FIG. 7. So as to ensure precise actuation of positioning means which provide the forces required for the relative movement of the second bending roller set 5 with respect to the first bending roller set 4, a measuring means 65, with which the length of the profile 1 passing through the entry guide 33 can be determined, is provided in the extrusion and roll-bending line 100 of FIG. 7.

As a result of the insertion of the profile 1 into the device 27 and the movement of the second bending roller set 5, a free end 61a of a portion 61 of the profile 1 exits the second roller set 5 on the output side 72 thereof, for example in the direction 66. In this context, the portion 61 which is still projecting from the second bending roller set 5 will move back and forth in both the y and the z spatial direction in accordance with the selected bending shape. So as to be able to cut the portion 61 off from the continuous strand 1b, once said portion has fully passed through the second bending roller set 5 up to the second end 61b thereof and is thus finally bent, a cutting means 67, which is movable in space, is provided on the output side 72, and comprises for example a blade 71 which cuts off the portion 61 to form the bent profile workpiece 1*a* at an appropriate moment, with program control. In this context, for example the length which has passed through, as determined by the measurement means 65, can be taken into account. Preferably, the cutting means 67 can be moved in space in such a way that on the one hand it can be tracked to the movements of the portion 61 during the bending in the y and z directions, and on the other hand it can also be tracked, as an entrained cutting means, to the advance movement of the portion 61 in the direction 66, substantially at the advance speed or entry speed of the profile 1, for a clean cut. The cutting means 67 is thus preferably also displaceable in the x direction. The current insertion speed can also be determined by means of the measurement means 65. While a new end 61*a* of a new portion 61 is exiting the second bending roll set 5 after the cutting, the cutting means 67 is preferably displaced back to the output side 72 in the vicinity of the second bending roller set 5, by the distance for which it was entrained with the previous portion 61 before the cut. Shortly before the portion 61 is cut off from the continuous strand 1*b*, in the embodiment of FIG. 7 the portion 61 is gripped by a handling means 80, so as to prevent the portion 61 from being deformed undesirably under its own weight, and so as to prevent the portion 61 from falling down after being cut off. Cutting off the portion 61 produces a bent profile workpiece 1*a*, which is thus held by means of the handling means 80 after being cut off, and transported further and/or set down thereby for further processing or storage. For example, the bent profile workpiece 1*a* can be set down on a deposition place 81. So as to be able to grasp the portion 61 correctly, the handling device 80, which may be in the form of a computer-controlled multi-axial industrial robot which is known per se, is equipped with an appropriate gripping tool 82 in the embodiment shown.

Figure 8:
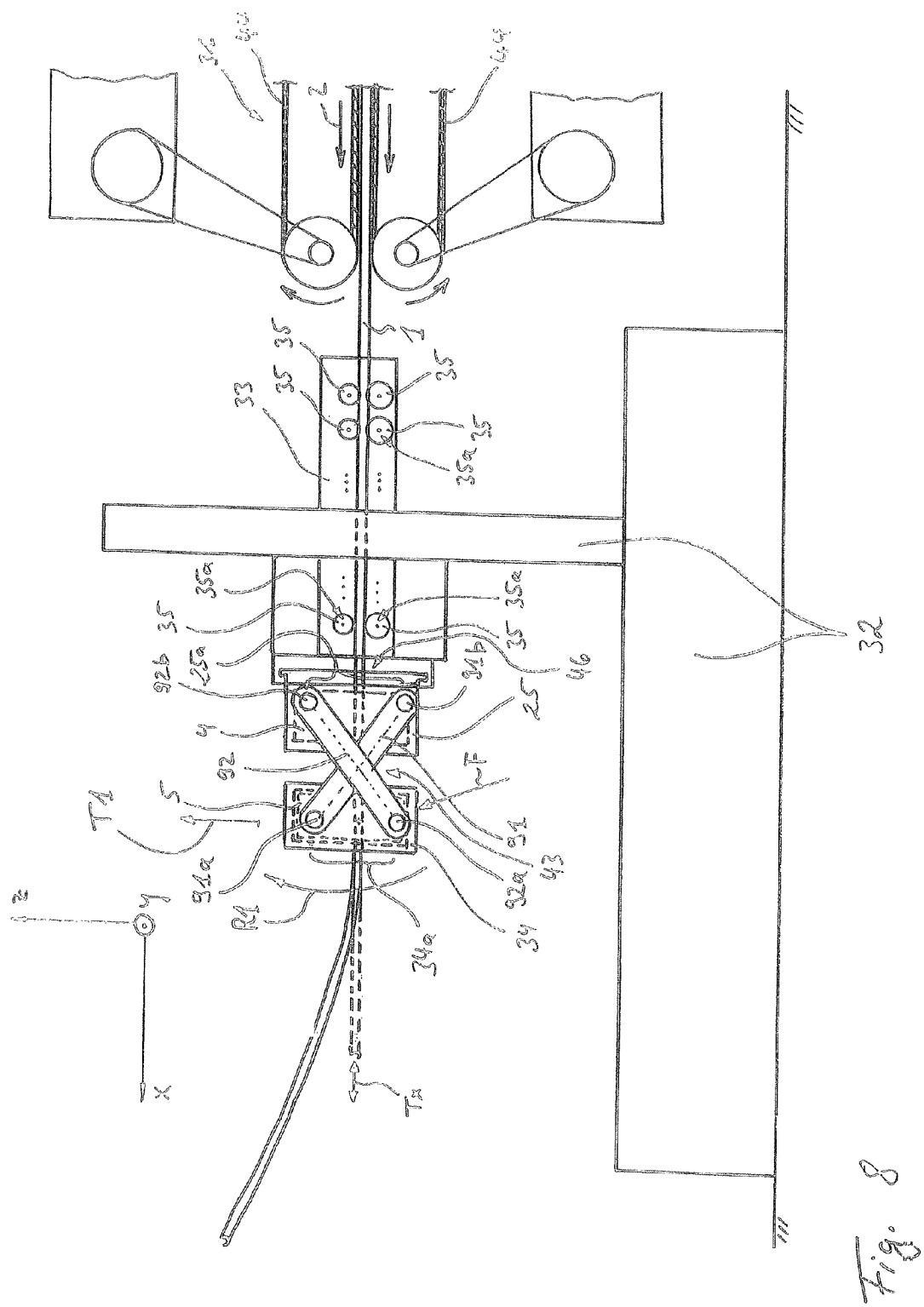
FIG. 8 is a side view of a device for roll-bending in accordance with another further embodiment of the invention, a discharge conveyor arrangement for inserting the profile being illustrated.

FIG. 8 shows a further embodiment of a device 27 for roll-bending a profile 1. Again, the device comprises a substructure 32, an entry guide 33, and a frame 25 and a bending head 34. Only the differences between the embodiment of FIG. 8 and the embodiment of FIG. 4 will be highlighted in the following.

As is shown in FIG. 8, in the device 27 in accordance with this embodiment, the connecting means 43, which connects the bending head 34 to the frame 25 which carries the first bending roller set 4, is formed with two mutually crossing connecting components 91 and 92. In this embodiment, the connecting components 91, 92 are substantially in the form of rods. The first connecting component 91 is connected to the bending head 34 via a first articulated connection 91*a* and to the frame 25 via a second articulated connection 91*b*. The second connecting component 92 is connected to the bending head 34 via a third articulated connection 92*a* and to the frame 25 via a fourth articulated connection 92*b*. A straight line connecting the articulated connection 91*a* and the articulated connection 91*b* crosses a straight line connecting the articulated connection 92*a* and the articulated connection 92*b*. The connecting components 91 and 92 can move past one another, as shown in FIG. 8. The articulated connections 91*a*, 91*b*, 92*a*, 92*b* are preferably in the form of single-axis rotary articulations, the axes of rotation of which extend mutually parallel and parallel to the y direction.

In this way, the connecting components 91 and 92, along with a region 34*a* of the bending head 34 and a region 25*a* of the frame 25, form a four-bar linkage. The four-bar linkage couples the bending head 34 and the frame 25 in such a way that the bending head 34 can carry out a combined rotational and translational movement with respect to the frame 25. This movement includes the translation T1 in the first spatial direction 11 (parallel to the z direction) and the rotation R1 about the first axis of rotation 12 (parallel to the y direction) which takes place simultaneously with the translation T1, as described with reference to FIGS. 1 and 2. In this context, the rotation R1 and the translation T1 are coupled to one another.

Further, when the bending head 34 is deflected from the neutral position shown in FIG. 8, the kinematics of the four-bar linkage also lead to a slight translational movement Tx of the bending head 34 in the x direction, that is to say normal to the direction of the translational movement T1. When the bending head 34 is deflected from the neutral position in the positive x direction, the bending head 34 is thus additionally translated a little in the negative x direction while rotating clockwise as shown.

As a result of the connection of the bending head 34 and the frame 25 in the manner shown in FIG. 8, it is sufficient to actuate the bending head 34 for the translation T1 and the rotation R1 by means of a single positioning means (not shown in FIG. 8), for example by applying a force F to the bending head 34. The coupling, shown in FIG. 8, of the bending head 34 and the frame 25 can be made use of in the devices 27 shown in FIGS. 4, 6 and 7.

In FIG. 8, respective guide rollers 35*a* are provided in the entry guide 33. These guide rollers 35*a* serve to guide the profile 1 appropriately during introduction into the bending head 34.

Instead of using guide rollers 35 in the front region of the entry guide 33, any other guide means would also be conceivable for this purpose. For example, it would be conceivable and advantageous for a sliding block to be provided as the guide means instead of the guide rollers 35*a* (or in addition to the guide rollers 35*a*). Unlike guide rollers 35*a*, sliding blocks have the advantage, as guide means, of exerting a smaller load on the profile 1 which is to be guided. In addition, it would also be conceivable to use any other guide means which is appropriate for introducing the profile 1 into the bending head 34.

Although the present invention was described in the above by way of preferred embodiments, it is not limited thereto, but rather can be modified in a wide range of ways.

For example, the profile could contain more or fewer than two metal profiles to form the reinforcement or could also be configured without inlays or a reinforcement.

Further, more than two pairs of bending rollers per bending roller set could also surround the respective passage 4*e*, 5*e*.

PREFERRED EMBODIMENTS

1. Method for roll-bending a profile 1 which comprises at least one cross-sectional region 22*a*, 22*b* which is formed from a plastics material which is shaped by extrusion, comprising the following steps:
   a first bending roller set 4 and a second bending roller set 5 are provided, each comprising bending rollers 4*a-d*, 5*a-d* which are arranged in such a way that a passage 4*e*, 5*e*, which enables guiding the profile 1, is formed between the bending rollers 4*a-d*, 5*a-d* of each of the bending roller sets 4, 5;
   the profile 1 is inserted into the first bending roller set 4;
   during the insertion, the profile 1 is guided through the first bending roller set 4 and the second bending roller set 5; and
   during the insertion and guidance of the profile 1, the second bending roller set 5 is displaced relative to the first bending roller set 4 in such a way that the second bending roller set 5 is translated in at least a first spatial direction 11 and a second spatial direction 14 which is non-parallel thereto, and rotated about at least a first axis of rotation 12 and a second axis of rotation 15 which is non-parallel thereto, resulting in the profile 1 being bent about a first bending axis 13 and about a second bending axis 16 which is non-parallel to the first bending axis 13, the translations T1, T2 and rotations R1, R2 of the second bending roller set 5 being brought about simultaneously at least at times and/or mutually offset in time in a predetermined sequence.

2. Method according to embodiment 1, characterised in that the first and second spatial directions 11, 14 are each orientated at an inclination to an insertion direction 2 in which the profile 1 is inserted, preferably each substantially perpendicular thereto.

3. Method according to either embodiment 1 or embodiment 2, characterised in that the first and second spatial directions 11, 14 are orientated substantially mutually perpendicular.

4. Method according to any one of the preceding embodiments, characterised in that the first axis of rotation 12 extends substantially perpendicular to the first spatial direction 11, the rotation R1 about the first axis of rotation 12 being simultaneous with the translation T1 in the first spatial direction 11, for the bending about the first bending axis 13.

5. Method according to any one of the preceding embodiments, characterised in that the second bending roller set 5 is formed with at least one pair 8, 9 of bending rollers 5a-b, 5c-d, which have roller axes of rotation 7a-b, 7c-d which extend mutually parallel.

6. Method according to embodiment 5, characterised in that the second bending roller set 5 is formed with two pairs 8, 9 of bending rollers 5a-b, 5c-d, the roller axes of rotation 7a-b, 7c-d of the bending rollers 5a-b, 5c-d of each pair 8, 9 extending mutually parallel.

7. Method according to either embodiment 5 or embodiment 6, characterised in that the second axis of rotation 15 always extends parallel to the roller axes of rotation 7c-d of one of the pairs 9 of bending rollers 5c-d of the second bending roller set 5.

8. Method according to any one of the preceding embodiments, characterised in that, for the bending about the second bending axis 16, the rotation R2 about the second axis of rotation 15 is simultaneous with the translation T2 in the second spatial direction 14.

9. Method according to any one of the preceding embodiments, characterised in that the movement of the second bending roller set 5 comprises an additional rotation R3 of the second bending roller set 5 with respect to the first bending roller set 4 about a third axis of rotation 17, simultaneous at least at times and/or mutually offset in time in a predetermined sequence with respect to the rotations R1, R2 and translations T1, T2 thereof, said third axis of rotation extending tangential to a trajectory B of the profile 1, in a region of the profile 1 which is received in the passage 5e of the second bending roller set 5, resulting in the profile 1 being provided with a twist, at least in regions, in addition to the bending about the first bending axis 13 and about the second bending axis 16.

10. Method according to any one of the preceding embodiments, characterised in that the bending rollers 4a-d of the first bending roller set 4 are each set in rotation exclusively by the movement of the profile 1 during the insertion thereof, and the bending rollers 5a-d of the second bending roller set 5 are each set in rotation exclusively by the movement of the profile 1 during the insertion thereof and by the rotations R1, R2 of the second bending roller set 5 about the first and second axes of rotation 12, 15, and roll off on the profile 1 in this context.

11. Method according to any one of the preceding embodiments, characterised in that the insertion of the profile 1 is brought about by means of a discharge conveyor arrangement 31.

12. Method according to embodiment 11, characterised in that the discharge conveyor arrangement 31 comprises two belts 44 or track rollers, extending mutually parallel in portions and preferably endless, each comprising a flexible surface 45 which faces the profile 1, and in that the profile 1 is transported between the belts 44 or track rollers by way of surface contact with the belts 44 or track rollers so as to insert it.

13. Method according to any one of the preceding embodiments, characterised in that, before being inserted into the first bending roller set 4, the profile 1 initially passes through an entry guide 33 comprising one or more sets of guide rollers 35 for guiding the profile 1 and for preventing the profile 1 from buckling, the profile 1 being inserted into the entry guide 33 and entering the passage 4e of the first bending roller set 4 at the output end 46 of the entry guide 33, and the guide rollers 35 being set in rotation about the respective roller axes of rotation 35a thereof exclusively by the movement of the profile 1 during the insertion thereof.

14. Profile 1 which comprises at least one cross-sectional region 22a, 22b formed from a plastics material shaped by extrusion, roll-bent by a method according to at least one of the preceding embodiments.

15. Method for producing bent profile workpieces 1a by means of an extrusion and roll-bending line 100, in which a profile 1 is formed as a continuous strand 1b from a plastics material shaped by extrusion, by means of an extrusion tool 56, in at least one cross-sectional region 22a, 22b, and subsequent to the extrusion process, portions 61 of the profile 1 which are in succession in the extrusion and roll-bending line 100 are subjected to roll-bending to form the bent profile workpieces 1a by a method according to any one of embodiments 1 to 13.

16. Method according to embodiment 15, characterised in that at least one reinforcement 21 consisting of a metal material, in particular a steel, is embedded in the plastics material at least in part during the extrusion process inside the extrusion tool 56.

17. Method according to either embodiment 15 or embodiment 16, characterised in that, after passing through the first bending roller set 4 and the second bending roller set 5, each of the portions 61 of the profile 1 is cut off from the continuous strand 1b so as to form one of the bent profile workpieces 1a, by means of a cutting means 67 which can be moved in space on the output side 72 of the second bending roller set 5.

18. Method according to embodiment 17, characterised in that, after exiting the second bending roller set 5, the portion 61 of the profile 1 is gripped on the output side 72 thereof by means of a handling means 80, before or while the portion 61 is cut off from the continuous strand 1b, the handling means 80 being tracked to a spatial movement of the portion 61 brought about by the roll bending, and after being cut off from the continuous strand 1b, the produced bent profile workpiece 1a being transported onwards and/or set down, for further processing or storage, by means of the handling means 80.

19. Bent profile workpiece 1a, which comprises at least one cross-sectional region 22a, 22b formed from a plastics material shaped by extrusion, produced by a method according to any one of embodiments 15 to 18.

20. Device 27 for roll-bending a profile 1 which comprises at least one cross-sectional region 22a, 22b formed from a plastics material shaped by extrusion,
comprising a first bending roller set 4 and a second bending roller set 5, which each comprise bending rollers 4a-d, 5a-d which are arranged in such a way that a passage 4e, 5e, which enables guiding the profile 1, is formed between the bending rollers 4a-d, 5a-d of each of the bending roller sets 4, 5;
comprising a frame 25, on which the bending rollers 4a-d of the first bending roller set 4 are mounted; and
comprising a bending head 34 which carries the second bending roller set 5 and is movable with respect to the frame 25;
wherein the bending head 34 is coupled to the frame 25 in such a way that the bending head 34, for bending the profile 1 about a first bending axis 13, can be rotated about a first axis of rotation 12 and translated in at least a first spatial direction 11 with respect to the frame 25;
wherein the second bending roller set 5 is coupled to the bending head 34 in such a way that the second bending roller set 5, for bending the profile 1 about a second bending axis 16 which is non-parallel to the first bending axis 13, can be rotated about a second axis of rotation 15 and translated in at least a second spatial direction 14 with respect to the bending head 34;
wherein the first and second spatial directions 11, 14 are orientated non-parallel to one another, and the first and second axes of rotation 12, 15 are orientated non-parallel to one another.

21. Device according to embodiment 20, characterised in that the first and second spatial directions 11, 14 are each orientated at an inclination to an insertion direction 2 in which the profile 1 can be inserted into the first bending roller set 4, preferably each substantially perpendicular thereto.

22. Device according to either embodiment 20 or embodiment 21, characterised in that the first and second spatial directions 11, 14 are orientated substantially mutually perpendicular.

23. Device according to any one of embodiments 20 to 22, characterised in that the first axis of rotation 12 extends substantially perpendicular to the first spatial direction 11, and in that the bending head 34 is coupled to the frame 25 in such a way that, for bending the profile 1 about the first bending axis 13, the bending head 34 can carry out a combined rotational and translational movement R1, T1 with respect to the frame 25, in which the rotation R1 about the first axis of rotation 12 is simultaneous with the translation T1 in the first spatial direction 11.

24. Device according to embodiment 23, characterised in that the device 27 comprises at least one first connecting component 91 and at least one second connecting component 92, each of the first and second connecting components 91, 92 connecting the bending head 34 to the frame 25 via articulated connections 91a, 91b, 92a, 92b, in such a way that, together with the connecting components 91, 92, regions 34a, 25a of the bending head 34 and the frame 25 which are arranged between the articulated connections 91a, 91b, 92a, 92b form a four-bar linkage, which makes possible the combined rotational and translational movement R1, T1 of the bending head 34 with respect to the frame 25 for bending the profile 1 about the first bending axis 13.

25. Device according to embodiment 24, characterised in that the first and second connecting components 91, 92 each couple two of the articulated connections 91a, 91b, 92a, 92b together in a cross.

26. Device according to any one of embodiments 20 to 25, characterised in that the second bending roller set 5 is formed with at least one pair 8, 9 of bending rollers 5a-d, 5c-d, which comprise roller axes of rotation 7a-b, 7c-d which extend mutually parallel.

27. Device according to embodiment 26, characterised in that the second bending roller set 5 is formed with two pairs 8, 9 of bending rollers 5a-b, 5c-d, the roller axes of rotation 7a-b, 7c-d of the bending rollers 5a-b, 5c-d of each pair 8, 9 extending mutually parallel.

28. Device according to either embodiment 26 or embodiment 27, characterised in that the second bending roller set 5 is coupled to the bending head 34 in such a way that the second axis of rotation 15 is always parallel to the roller axes of rotation 7c-d of one of the pairs 9 of bending rollers 5c-d of the second bending roller set 5.

29. Device according to any one of embodiments 20 to 28, characterised in that the second bending roller set 5 is coupled to the bending head 34 in such a way that, for the bending about the second bending axis 16, the rotation R2 about the second axis of rotation 15 can be brought about simultaneously with the translation T2 in the second spatial direction 14.

30. Device according to any one of embodiments 20 to 29, characterised in that the second bending roller set 5 is further coupled to the bending head 34 in such a way that the second bending roller set 5 can be rotated with respect to the first bending roller set 4 about a third axis of rotation 17, which extends substantially tangential to a trajectory B of the profile 1 in a region of the profile 1 which is received in the passage 5e of the second bending roller set 5, so as to provide the profile 1 with a twist, at least in regions, in addition to the bending about the first bending axis 13 and about the second bending axis 16.

31. Device according to any one of embodiments 20 to 30, characterised in that the bending rollers 4a-d of the first bending roller set 4 and the bending rollers 5a-d of the second bending roller set 5 are mounted so as to be freely rotatable about the respective roller axes of rotation 6a-d, 7a-d thereof.

32. Device according to any one of embodiments 20 to 31, characterised in that the device 27 further comprises an entry guide 33 comprising one or more sets of guide rollers 35 for guiding the profile 1 and for preventing the profile 1 from buckling, the entry guide 33 being arranged in such a way that the profile 1 which is inserted into the entry guide 33 enters the passage 4e of the first bending roller set 4 at the output end 46 of the entry guide 33 after passing through it, and the guide rollers 35 being mounted so as to be freely rotatable about the respective roller axes of rotation 35a thereof.

33. Extrusion and roll-bending line 100 for producing bent profile workpieces 1a, comprising an extrusion tool 56, which is set up so as to form a profile 1 as a continuous strand 1b from a plastics material shaped by extrusion, in at least one cross-sectional region 22a, 22b, and comprising a device 27 according to any one of embodiments 20 to 32, which is arranged on the output side 58 of the extrusion tool 56 and is provided so as to subject portions 61 of the profile 1 which are in succession to roll-bending so as to form the bent profile workpieces 1a, subsequent to the extrusion process.

What is claimed is:

1. A method for roll-bending a profile which comprises at least one cross-sectional region which is formed from a plastics material which is shaped by extrusion,
   wherein the profile is formed as a continuous strand from the plastics material shaped by extrusion, by means of an extrusion tool, in the at least one cross-sectional region,
   wherein at least one reinforcement formed from a metal material is embedded in the plastics material at least in part during the extrusion process inside the extrusion tool,
   wherein an extrusion and roll-bending line comprises a deformation means and wherein before the reinforcement is introduced into the extrusion tool, a metal band is brought into a cross-sectional shape by way of the deformation means and forms a metal profile for the reinforcement, and
   wherein subsequent to the extrusion process, portions of the profile which are in succession in the extrusion and roll-bending line are subjected to roll-bending to form bent profile workpieces, the method comprising the following steps:
   a first bending roller set and a second bending roller set are provided, each comprising bending rollers which are arranged in such a way that a passage, which enables guiding the profile, is formed between the bending rollers of each of the bending roller sets;
   the profile is inserted into the first bending roller set;
   during the insertion, the profile is guided through the first bending roller set and the second bending roller set, the bending rollers of the second bending roller set rolling off on a profile surface on an inside and an outside of the profile; and
   during the insertion and guidance of the profile, the second bending roller set is displaced relative to the first bending roller set in such a way that the second bending roller set is translated in at least a first spatial direction and a second spatial direction which is non-parallel thereto, and rotated about at least a first axis of rotation and a second axis of rotation which is non-parallel thereto, resulting in the profile being bent about a first bending axis and about a second bending axis which is non-parallel to the first bending axis, the translations and rotations of the second bending roller set being brought about simultaneously at least at times and/or mutually offset in time in a predetermined sequence,
   wherein the first and second spatial directions are each orientated at an inclination to an insertion direction in which the profile is inserted.

2. The method of claim 1, wherein the first and second spatial directions each extend substantially perpendicular to the insertion direction in which the profile is inserted.

3. The method of claim 1, wherein the first and second spatial directions are orientated substantially mutually perpendicular.

4. The method of claim 1, wherein the first axis of rotation extends substantially perpendicular to the first spatial direction, the rotation about the first axis of rotation being simultaneous with the translation in the first spatial direction, for the bending about the first bending axis.

5. The method of claim 1, wherein the second bending roller set is formed with at least one pair of bending rollers, which have roller axes of rotation which extend mutually parallel.

6. The method of claim 5, wherein the second bending roller set is formed with two pairs of bending rollers, the roller axes of rotation of the bending rollers of each pair extending mutually parallel.

7. The method of claim 5, wherein the second axis of rotation always extends parallel to the roller axes of rotation of one of the pairs of bending rollers of the second bending roller set.

8. The method of claim 1, wherein, for the bending about the second bending axis, the rotation about the second axis of rotation is simultaneous with the translation in the second spatial direction.

9. The method of claim 1, wherein the movement of the second bending roller set comprises an additional rotation of the second bending roller set with respect to the first bending roller set about a third axis of rotation, simultaneous at least at times or mutually offset in time in a predetermined sequence with respect to the rotations and translations thereof, said third axis of rotation extending tangential to a trajectory of the profile, in a region of the profile which is received in the passage of the second bending roller set, resulting in the profile being provided with a twist, at least in regions, in addition to the bending about the first bending axis and about the second bending axis.

10. The method of claim 1, wherein the bending rollers of the first bending roller set are each set in rotation exclusively by the movement of the profile during the insertion thereof, and the bending rollers of the second bending roller set are each set in rotation exclusively by the movement of the profile during the insertion thereof and by the rotations of the second bending roller set about the first and second axes of rotation, and roll off on the profile in this context.

11. The method of claim 1, wherein the insertion of the profile is brought about by means of a discharge conveyor arrangement.

12. The method of claim 11, wherein the discharge conveyor arrangement comprises two belts or track rollers, extending mutually parallel in portions and preferably endless, each comprising a flexible surface which faces the profile, and in that the profile is transported between the belts or track rollers by way of surface contact with the belts or track rollers so as to insert it.

13. The method of claim 1, wherein, before being inserted into the first bending roller set, the profile initially passes through an entry guide comprising one or more sets of guide rollers for guiding the profile and for preventing the profile from buckling, the profile being inserted into the entry guide and entering the passage of the first bending roller set at the output end of the entry guide, and the guide rollers being set in rotation about the respective roller axes of rotation thereof exclusively by the movement of the profile during the insertion thereof.

14. The method of claim 1, wherein the metal material is a steel.

15. The method of claim 1, wherein, after passing through the first bending roller set and the second bending roller set, each of the portions of the profile is cut off from the continuous strand so as to form one of the bent profile workpieces, by means of a cutting means which can be moved in space on the output side of the second bending roller set.

16. The method of claim 15, wherein, after exiting the second bending roller set, the portion of the profile is gripped on the output side thereof by means of a handling means, before or while the portion is cut off from the continuous strand, the handling means being tracked to a spatial movement of the portion brought about by the roll bending, and after being cut off from the continuous strand, the produced bent profile workpiece being transported onwards or set down, for further processing or storage, by means of the handling means.

17. A method for producing bent profile workpieces by an extrusion and roll-bending line,
wherein a profile shaped with an irregular cross-section is formed as a continuous strand from a plastics material shaped by extrusion, by means of an extrusion tool, in at least one cross-sectional region,
wherein at least one metal reinforcement is embedded in the plastics material at least in part during the extrusion process inside the extrusion tool,
wherein a metal profile for the reinforcement is formed by deforming a planar metal band within the extrusion and roll-bending line, thereby bringing the metal band into a cross-sectional shape, before the reinforcement enters the extrusion tool, and
wherein subsequent to the extrusion process, portions of the profile which are in succession in the extrusion and roll-bending line are subjected to roll-bending after the plastics material has cooled down to form the bent profile workpieces by a method comprising the following steps:
a first bending roller set and a second bending roller set are provided, each comprising bending rollers which are arranged in such a way that a passage, which enables guiding the profile, is formed between the bending rollers of each of the bending roller sets;
the profile is inserted into the first bending roller set;
during the insertion, the profile is guided through the first bending roller set and the second bending roller set, the bending rollers of the second bending roller set rolling off on the surface of the profile; and
during the insertion and guidance of the profile, the second bending roller set is displaced relative to the first bending roller set in such a way that the second bending roller set is translated in at least a first spatial direction and a second spatial direction which is non-parallel thereto, and rotated about at least a first axis of rotation and a second axis of rotation which is non-parallel thereto, resulting in the profile being bent about a first bending axis and about a second bending axis which is non-parallel to the first bending axis, the translations and rotations of the second bending roller set being brought about simultaneously at least at times and/or mutually offset in time in a predetermined sequence,
wherein the first spatial direction extends substantially perpendicular to an insertion direction in which the profile is inserted.

18. A method for roll-bending a profile which comprises at least one cross-sectional region which is formed from a plastics material which is shaped by extrusion,
wherein the profile is formed as a continuous strand from the plastics material shaped by extrusion, by means of an extrusion tool, in the at least one cross-sectional region,
wherein at least one reinforcement comprising at least one metal profile is introduced into the extrusion tool and embedded in the plastics material at least in part during the extrusion process inside the extrusion tool,
wherein the metal profile for the reinforcement is formed by deforming a planar metal band within an extrusion and roll-bending line, thereby bringing the metal band into a cross-sectional shape, before the reinforcement enters the extrusion tool, and
wherein subsequent to the extrusion process, portions of the profile which are in succession in the extrusion and roll-bending line are subjected to roll-bending after the plastics material has cooled down to form bent profile workpieces, the method comprising the following steps:
a first bending roller set and a second bending roller set are provided, each comprising bending rollers which are arranged in such a way that a passage, which enables guiding the profile, is formed between the bending rollers of each of the bending roller sets;
the profile is inserted into the first bending roller set;
during the insertion, the profile is guided through the first bending roller set and the second bending roller set; and
during the insertion and guidance of the profile, the second bending roller set is displaced relative to the first bending roller set in such a way that the second bending roller set is translated in at least a first spatial direction and a second spatial direction which is non-parallel thereto, and rotated about at least a first axis of rotation and a second axis of rotation which is non-parallel thereto, resulting in the profile being bent about a first bending axis and about a second bending axis which is non-parallel to the first bending axis, the translations and rotations of the second bending roller set being brought about simultaneously at least at times and/or mutually offset in time in a predetermined sequence,
wherein the first and second spatial directions are each orientated at an inclination to an insertion direction in which the profile is inserted.

19. The method of claim 18, wherein, before being inserted into the first bending roller set, the profile initially passes through an entry guide comprising one or more sets of guide rollers for guiding the profile and for preventing the profile from buckling, the profile being inserted into the entry guide and entering the passage of the first bending roller set at the output end of the entry guide, and the guide rollers being set in rotation about the respective roller axes of rotation thereof exclusively by the movement of the profile during the insertion thereof.

\* \* \* \* \*